(12) United States Patent
Polishchuk et al.

(10) Patent No.: US 11,381,635 B2
(45) Date of Patent: Jul. 5, 2022

(54) METHOD OF OPERATING A SERVER APPARATUS FOR DELIVERING WEBSITE CONTENT, SERVER APPARATUS AND DEVICE IN COMMUNICATION WITH SERVER APPARATUS

(71) Applicant: MAXYMISER LTD., Edinburgh (GB)

(72) Inventors: Alexander Polishchuk, Dnipropetrovsk (UA); Dmitriy Skorokhodov, Dnipropetrovsk (UA); Dimitris Tsomokos, London (GB)

(73) Assignee: MAXYMISER LTD., Redwood Shores, CA (US)

( * ) Notice: Subject to any disclaimer, the term of this patent is extended or adjusted under 35 U.S.C. 154(b) by 632 days.

(21) Appl. No.: 14/400,378

(22) PCT Filed: May 10, 2013

(86) PCT No.: PCT/GB2013/051216
§ 371 (c)(1),
(2) Date: Nov. 11, 2014

(87) PCT Pub. No.: WO2013/167908
PCT Pub. Date: Nov. 14, 2013

(65) Prior Publication Data
US 2015/0142872 A1 May 21, 2015

(30) Foreign Application Priority Data
May 11, 2012 (GB) .................................. 1208290

(51) Int. Cl.
*H04L 67/10* (2022.01)
*G06F 16/957* (2019.01)
(Continued)

(52) U.S. Cl.
CPC ............ *H04L 67/10* (2013.01); *G06F 16/957* (2019.01); *G06Q 30/0242* (2013.01); *H04L 67/42* (2013.01)

(58) Field of Classification Search
CPC ..... G06Q 30/0242; H04L 67/42; H04L 67/10; G06F 17/30899
See application file for complete search history.

(56) References Cited

U.S. PATENT DOCUMENTS

| 8,171,128 B2 * | 5/2012 | Zuckerberg | G06Q 30/02 707/702 |
| 8,341,516 B1 * | 12/2012 | Mason | G06F 17/2247 715/238 |
| 8,880,607 B1 * | 11/2014 | Merom | G06Q 10/10 705/319 |
| 9,143,572 B2 * | 9/2015 | Donovan | G06Q 30/02 |

(Continued)

FOREIGN PATENT DOCUMENTS

| WO | 2008/076741 A1 | 6/2008 | |
| WO | WO2008076741 | * 6/2008 | ............. G06Q 10/00 |

OTHER PUBLICATIONS

International Search Report, dated Jun. 28, 2013, issued in International Application No. PCT/GB2013/051216.
(Continued)

*Primary Examiner* — Joseph L Greene
(74) *Attorney, Agent, or Firm* — Invoke

(57) ABSTRACT

Method for delivering content comprising the steps of: (i) generating and storing website content experiences, and storing a respective weighting for each experience; (ii) offering the stored website content experiences based on its weighting, and storing a record of the website content experience offerings; (iii) receiving user-initiated website content actions from the computer devices; (iv) storing the user-initiated website content actions from the computer (Continued)

Predictions from Prediction block

Weights of variants devices in relation to the website content experience offered; (v) analysing the user-initiated website content actions in relation to the record of website content experience offerings to determine a frequency of website content experience actions in relation to a frequency of website content experience offerings, and (vi) adjusting the stored weighting of a website content experience in response to the determined frequency of website content experience actions in relation to the frequency of website content experience offerings satisfying a criterion and an associated statistical significance criterion.

21 Claims, 23 Drawing Sheets

(51) Int. Cl.
*G06Q 30/02* (2012.01)
*H04L 67/01* (2022.01)

(56) References Cited

U.S. PATENT DOCUMENTS

| | | | |
|---|---|---|---|
| 9,245,274 B2* | 1/2016 | Reavis | G06Q 30/02 |
| 2002/0042738 A1 | 4/2002 | Srinivasan et al. | |
| 2003/0014304 A1 | 1/2003 | Calvert et al. | |
| 2004/0030597 A1 | 2/2004 | Bibas | |
| 2006/0265368 A1* | 11/2006 | Nickerson | G06Q 30/02 |
| 2008/0114778 A1* | 5/2008 | Siegel | G06F 16/90 |
| 2009/0094137 A1 | 4/2009 | Toppenberg et al. | |
| 2009/0248883 A1* | 10/2009 | Suryanarayana | G06F 9/451 |
| | | | 709/229 |
| 2009/0282343 A1* | 11/2009 | Catlin | G06F 17/30867 |
| | | | 715/738 |
| 2015/0161653 A1* | 6/2015 | Raichelgauz | G06Q 30/0242 |
| | | | 705/14.41 |

OTHER PUBLICATIONS

Combined Search and Examination Report, dated Oct. 30, 2013, issued in corresponding GB Application No. 1308447.0.

* cited by examiner

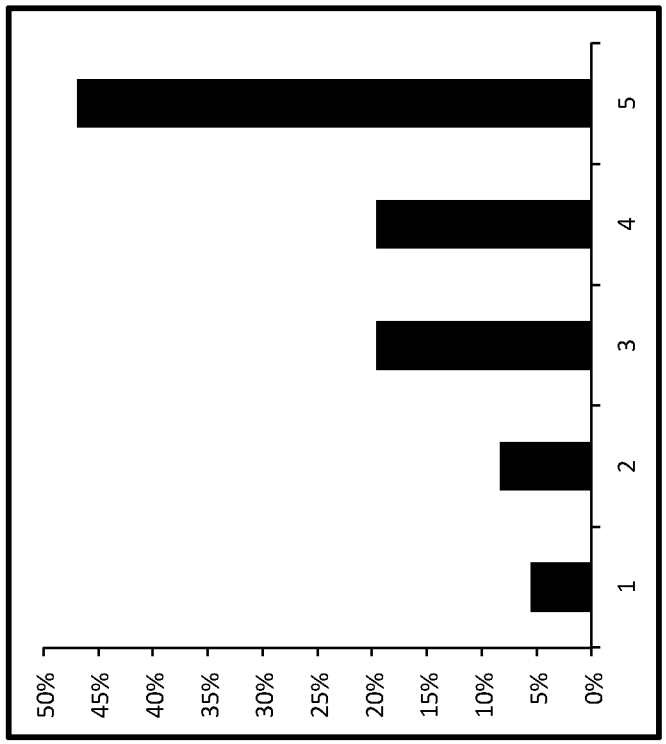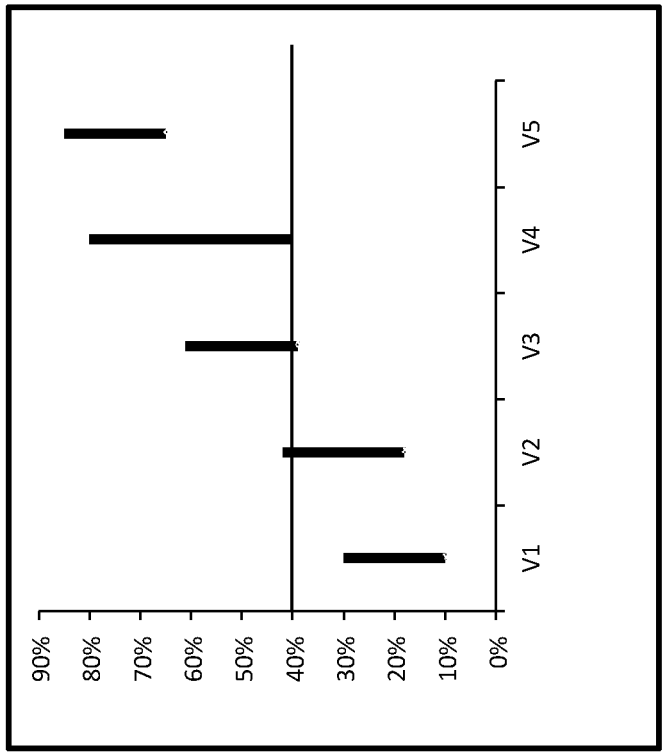
FIGURE 4

Alert Type

| Metric | Winner Found Alert 1 | NO Winner Found Alert 1 | Winner Found Alert 2 | NO Winner Found Alert 2 |
|---|---|---|---|---|
| Day X | $X \geq D+7$ | $X \geq D+7$ | $X \geq \max\{15; D+5\}$ | $X \geq \max\{28; D+10\}$ |
| Relative Error of any content E | $\text{Err}(E) \leq 20\%$ | $\text{Err}(E) \leq 20\%$ | $\text{Err}(E) \leq 20\%$ | $\text{Err}(E) \leq 20\%$ |
| Relative Error of E_top only | $\text{Err}(E_{top}) \leq 10\%$ | | | |
| CI of E_top against all others on X | $\overline{\text{CI}(E_{top}, E)} \geq 95\%$ for every content $E \neq E_{top}$ | $\overline{\text{CI}(E_{top}, E')} \leq 20\%$ for some content $E' \neq E_{top}$ | $\overline{\text{CI}(E_{top}, E)} \geq 90\%$ for every content $E \neq E_{top}$ | $\overline{\text{CI}(E_{top}, E')} \leq 50\%$ for some content $E' \neq E_{top}$ |
| CI of E_top STABILITY | $\text{CI}^{-d}(E_{top}, E) \geq 90\%$ for every and content $E \neq E_{top}$ d=1,2...6 | $\text{CI}^{-d}(E_{top}, E') \leq 30\%$ for day d=1,2...6 | $\text{CI}^{-d}(E_{top}, E) \geq 85\%$ for every and content $E \neq E_{top}$ d=1,2...9 | $\text{CI}^{-d}(E_{top}, E') \leq 60\%$ for every day d=1,2...13 |

Confidence level for error calculation is 0.95

Confidence level for error calculation is 0.95

Confidence level for error calculation is 0.90

FIGURE 7

```
public interface ICampaign : IValidatable
{
    IDomainInfo DomainInfo { get; }
    CampaignType Type { get; }
    string Name { get; }
    int Id { get; }
    int ActionId { get; }
    IModelSettings ModelSettings { get; }
    int PossibleCombinationsCount { get; }
    int FullCombinatorics { get; }
    ReadOnlyCollection<IExperience> Experiences { get; }
    ReadOnlyCollection<IElement> Elements { get; }
    bool HasExperienceRules { get; }
} public interface IValidatable
{
    void Validate();
}
```

FIGURE 12

| Content ID | Actions | Generations | ... |
|---|---|---|---|
| -123456789 | 10 | 100 | |
| ... | ... | ... | |

FIGURE 14A

| Content ID | Attribute Value 1 | | ... | Attribute Value N | | ... |
| | Actions | Generations | | Actions | Generations | |
|---|---|---|---|---|---|---|
| -123456789 | 10 | 100 | ... | 15 | 200 | ... |
| ... | ... | ... | ... | ... | ... | ... |

FIGURE 14B

```
public class ContentStat<T>
{
    public readonly ReadOnlyCollection<T> Data;
    public ContentStat(ReadOnlyCollection<T> data) {...}
} public class AttributeStat<T>
{
    public readonly ReadOnlyDictionary<string, ContentStat<T>> Data;
    public readonly string OlapName;
    public AttributeStat(ReadOnlyDictionary<string,
                         ContentStat<T>> data, string olapName) {...}
} public class StatData<T>
{
    public readonly ReadOnlyCollection<int> ContentOrder;
    public readonly ContentStat<T> Total;
    public readonly ReadOnlyDictionary<string, AttributeStat<T>> Attributes;
    public StatData(ContentStat<T> total, ReadOnlyDictionary<string, AttributeStat<T>> attributes,
                    ReadOnlyCollection<int> contentOrder) {...}
}
```

FIGURE 15

| Content ID | Day 1 | | | ... | ... | ... |
|---|---|---|---|---|---|---|
| | Actions/Revenue | Generations | Revenue squared | | | |
| 1 | 10 | 100 | 20 | ... | ... | ... |
| ... | ... | ... | ... | ... | ... | ... |

FIGURE 21

METHOD OF OPERATING A SERVER APPARATUS FOR DELIVERING WEBSITE CONTENT, SERVER APPARATUS AND DEVICE IN COMMUNICATION WITH SERVER APPARATUS

CROSS REFERENCE TO RELATED APPLICATIONS

This application claims the priority of PCT/GB2013/051216, filed on May 10, 2013, which claims priority to Great Britain Application No. 1208290.5, filed on May 11, 2012, the entire contents of each of which is fully incorporated herein by reference.

BACKGROUND OF THE INVENTION

1. Field of the Invention

The field of the invention relates to methods of operating a server apparatus for delivering website content, to server apparatus configured to perform such methods, to uses of such methods, to server apparatus and to devices in communication with server apparatus.

2. Technical Background

Content optimization problems are ubiquitous in online content provision (eg. marketing): in a typical scenario, a marketer wants to test the performance of various elements on a website against visitor behaviour and decide which elements work best for a given set of goals. These goals typically fall into one of two broad categories, that is, either to boost engagement or to increase revenue—although of course both can be happening at the same time. The detailed implementation of such optimization campaigns involves the following main steps:

1. Design: In this step the marketer decides which elements (relative position on webpage, colour, copy, etc.) are going to be tested and designers produce these for inclusion in a content optimization campaign ('test' campaign).

2. Campaign Management: The various elements are inserted into an optimization campaign; the campaign is manually monitored for performance; depending on traffic volumes the campaign is manually optimized by the marketer; and finally the campaign is ended.

3. Campaign Conclusion: The marketer learns which elements are best performers, which are worst and which are neutral with respect to some 'default' (or 'control') content.

Here we discuss some remaining problems. Assuming that the first step has led to the setup of a campaign that is free from basic design flaws, certain important issues can be identified with the 'manual' management of optimization campaigns, as described in the second and third steps of the process described above. Perhaps the most important of these issues are (1) the subjective nature of decision-making for the optimization of elements or their combinations; (2) the resulting premature removal of elements or their combinations from a campaign; (3) the amount of time spent on monitoring of progress; and (4) the total 'cost of learning' for the marketer, namely, the situation where the campaign as a whole has led to losses in engagement or revenue, due to the presence of underperforming elements.

3. Discussion of Related Art

In EP1146443B1 and in EP1146443A2, it is disclosed that in a method for storing and accessing electronic content (e.g. for a Website), content objects are stored in a structured manner in a content store. Some of the content objects in the content store are identified as shortcuts (56, 57), pointing to other objects in the content store. When a shortcut is accessed, the target object pointed to by that shortcut is automatically accessed from the content store and returned in place of the shortcut object. This provides a way of structuring websites and other forms of content delivery. Reference may be had to EP1146443B1, to EP1146443A2 and to prior art FIG. 1 from EP1146443A2.

In EP1276295B1, it is disclosed that when a media device (300) is detachably connected to a user terminal device (200), a device identifier is transmitted to the user terminal device (200) from the media device (300). The user terminal device (200) then transmits the device identifier to a server device (100) that provides content and the server device (100) transmits the content in dependence on the device identifier and an environment to download configured by a user. Since the media device (300) is automatically connected to a specific website providing every kind of content necessary for each media device based on the device identifier of the media device (300), the user can download content more conveniently without driving a web browser. Reference may be had to EP1276295B1 and to prior art FIG. 2.

SUMMARY OF THE INVENTION

According to a first aspect of the invention, there is provided a method of operating a server apparatus for delivering website content to a plurality of computer devices, via a communication network, the server apparatus configured to receive user-initiated website content actions from the plurality of computer devices, the method comprising the steps of:

(i) generating and storing a plurality of website content experiences, and storing a respective weighting for each experience;

(ii) offering the stored website content experiences via the communication network, each website content experience being offered in accordance with its respective stored weighting, and storing a record of the website content experience offerings;

(iii) receiving at the server apparatus user-initiated website content actions from the plurality of computer devices;

(iv) storing a record of the user-initiated website content actions from the plurality of computer devices in relation to the website content experience offered;

(v) analysing the record of the user-initiated website content actions from the plurality of computer devices in relation to the record of website content experience offerings to determine a frequency of website content experience actions in relation to a frequency of website content experience offerings, and (vi) adjusting the respective stored weighting of a website content experience in response to the determined frequency of website content experience actions in relation to the frequency of website content experience offerings satisfying a criterion and an associated statistical significance criterion.

An advantage of the method is that website content is optimized according to satisfying a statistical significance criterion, which ensures that a required level of statistical significance is achieved before optimization occurs, which ensures that optimization does not occur based on statistically insignificant data, which would entail a risk of an incorrect optimization. A further advantage is that this method is performed by a server, rather than requiring work by a human, hence for example this can be performed on a daily basis, including on days on which a human would be on holiday, and for example the method is not prone to human error or to human biases in perception, such as to human biases in perception identified by Daniel Kahneman, winner of the 2002 Nobel Memorial Prize in Economic Sciences.

The method may be one in which website content includes elements, each element having at least two variants.

The method may be one in which each experience comprises a specific set of variants, over one or more web pages.

The method may be one in which the weightings are set to an equal weight for a predetermined initial period, after which adjustment of the weightings in step (vi) is permitted.

The method may be one comprising the further step of: offering the stored website content experience via the communication network, each website content experience being offered in accordance with its adjusted respective stored weighting.

The method may be one including a predictions step in which the future performance of experiences is predicted, and the method including a sampling rule step in which the predicted performance is transformed into a 'share of traffic' figure, that is, based on the prediction of future performance the sampling step decides what relative weights to assign to experiences.

The method may be one in which aggressiveness is applied in the adjustment of a respective stored weighting of a website content experience.

The method may be one in which aggressiveness includes excluding a worst experience or worst variant.

The method may be one in which aggressiveness includes a winning experience or winning variant receiving even more weight.

The method may be one in which sampling aggressiveness is adjusted so that weights are skewed towards a winner experience or winner variant.

The method may be one in which an aggressiveness mode is one of: aggressive, remove loser, remove more losers, and winner only.

The method may be one in which the method determines an aggressiveness parameter to be used in adjusting the weightings for website content experiences.

The method may be one in which an aggressiveness parameter value has predefined starting, maximum and minimum values.

The method may be one in which an aggressiveness parameter is used to convert predicted Metric values into Content Weights.

The method may be one in which the method is applied cyclically, wherein for each cycle of the method with positive uplift, the aggressiveness parameter is increased by a fixed amount, where uplift is given by the relative difference in a report's key metric between a given experience or variant and a default content.

The method may be one in which the method is applied cyclically, wherein for each cycle of the method with negative uplift, the aggressiveness parameter is decreased by a fixed amount, where uplift is given by the relative difference in a report's key metric between a given experience or variant and a default content.

The method may be one in which worst-performing experiences or worst-performing variants are given zero weighting.

The method may be one in which if worst-performing experiences or worst-performing variants are given zero weighting, the corresponding content is removed and does not participate in the next steps.

The method may be one in which every visitor accessing the server apparatus has a visitor cookie, which is received by, and stored on the corresponding computing device.

The method may be one in which the method includes performing a generalized method over a number of non-intersecting segments and over a specific set of attributes, wherein visitors are grouped into segments, and running several independent offline models, each using data only from a corresponding segment, while online modules serve incoming visitors with weights which are valid for their segment, where visitor cookies are used to define segments.

The method may be one in which a generation of campaign content is counted when a visitor is displayed a particular experience for the first time.

The method may be one in which a returning visitor will see the same content that they were shown upon the first generation of content.

The method may be one in which the criterion is optimizing Conversion Rate, Revenue per Generation, or Multiple Actions per Generation.

The method may be one including a step in which it is decided whether to optimize by elements or by experiences.

The method may be one in which if the number of elements is below a predefined threshold then the method optimizes by experiences.

The method may be one in which a Primary Metric tracks the actions, as chosen at the start of the campaign.

The method may be one including a step of extracting cyclically generations and daily values of the Primary Metric with Error Margins for all contents, elements and experiences, from a stored database.

The method may be one including a step of ranking Contents according to cumulative value of Primary Metric in ascending or descending order.

The method may be one including a step of comparing each and every one of the Contents against top-ranked Content and deciding if it can be removed from a campaign.

The method may be one including a step of performing smoothing of time series data using a low-pass filtering algorithm.

The method may be one wherein steps (ii) to (vi) of the method are applied in cycles so as to provide continuous content optimization.

The method may be one in which the method is applied in cycles, wherein on cycle N the method includes a step of predicting a Metric value for the next cycle, N+1.

The method may be one in which a cycle duration is a day.

The method may be one in which the method is fully automated and self-learning for website content optimization.

The method may be one in which the method improves a selection of website content variants based on their statistical performance as obtained from the analysis of visitors' clickstream data.

The method may be one in which the method is a method of improving the selection of element combinations or online visitor 'experiences' according to their relative performance.

The method may be one in which the method makes intelligent decisions on the best split of 'traffic share' between experiences.

The method may be one in which the method minimizes a campaign's total 'cost of learning'.

According to a second aspect of the invention, there is provided a server apparatus configured to perform a method according to any of the above methods.

According to a third aspect of the invention, there is provided a use of a method according to any of the above methods, in the context of a multi-variable testing campaign.

According to a fourth aspect of the invention, there is provided a use of a method according to any of the above methods, for the purposes of online marketing.

According to a fifth aspect of the invention, there is provided a computer program product stored on a non-transient storage medium, the computer program when running on a server apparatus operable to perform the methods of any of the above methods.

According to a sixth aspect of the invention, there is provided a server apparatus configured to deliver website content to a plurality of computer devices, via a communication network, the server apparatus configured to receive user-initiated website content actions from the plurality of computer devices, the server apparatus configured to:

(i) generate and store a plurality of website content experiences, and to store a respective weighting for each experience;
(ii) offer the stored website content experiences via the communication network, each website content experience being offered in accordance with its respective stored weighting, and to store a record of the website content experience offerings;
(iii) receive user-initiated website content actions from the plurality of computer devices;
(iv) store a record of the user-initiated website content actions from the plurality of computer devices in relation to the website content experience offered;
(v) analyse the record of the user-initiated website content actions from the plurality of computer devices in relation to the record of website content experience offerings to determine a frequency of website content experience actions in relation to a frequency of website content experience offerings;
(vi) adjust the respective stored weighting of a website content experience in response to the determined frequency of website content experience actions in relation to the frequency of website content experience offerings satisfying a criterion and an associated statistical significance criterion.

According to a seventh aspect of the invention, there is provided a use of the server apparatus according to a sixth aspect of the invention by a computer device in communication with the server apparatus.

According to an eighth aspect of the invention, there is provided a device for receiving a website content experience with an adjustable weighting, the device in communication with a server apparatus configured to deliver website content to a plurality of computer devices, via a communication network, the server apparatus configured to receive user-initiated website content actions from the plurality of computer devices, and to provide the website content experience with an adjustable weighting.

The device may include a data storage medium and a unique id stored on the data storage medium, wherein the unique id identifies the device to the server apparatus.

The device may be one wherein the unique id is placed on the device by the server apparatus.

The device may be one wherein the device receives a website content experience after an adjustable weighting of the website content experience has been adjusted by the server apparatus.

The device may be one wherein the server apparatus is according to a sixth aspect of the invention.

BRIEF DESCRIPTION OF THE DRAWINGS

The above and other aspects of the invention will now be described, by way of example only, with reference to the following Figures, in which:

FIG. 4 shows predictions from a prediction block, and weights of variants, in an example.

FIG. 7 shows an example of specific criteria for firing Alerts, presented in a Table.

FIG. 12 shows an example of Data transfer object (DTO) objects.

FIG. 14A shows an example of 'get content stat'. FIG. 14B shows an example of 'get attribute stat'.

FIG. 15 shows an example of a StatData<T> object explanation.

FIG. 21 shows an example of a data structure for raw data.

DETAILED DESCRIPTION

In an aspect, there is provided a method of operating a server apparatus for delivering website content to a plurality of computer devices, via a communication network, the server apparatus receiving user-initiated website content actions from the plurality of computer devices, the method comprising the steps of:

(i) generating and storing a plurality of website content experiences, and storing a respective weighting for each experience;
(ii) offering the stored website content experiences via the communication network, each website content experience being offered in accordance with its respective stored weighting, and storing a record of the website content experience offerings;
(iii) receiving at the server apparatus user-initiated website content actions from the plurality of computer devices;
(iv) storing a record of the user-initiated website content actions from the plurality of computer devices in relation to the website content experience offered;

(v) analysing the record of the user-initiated website content actions from the plurality of computer devices in relation to the record of website content experience offerings to determine a frequency of website content experience actions in relation to a frequency of website content experience offerings;

(vi) adjusting the respective stored weighting of a website content experience in response to the determined frequency of website content experience actions in relation to the frequency of website content experience offerings satisfying a criterion and an associated statistical significance criterion.

Figure 17:
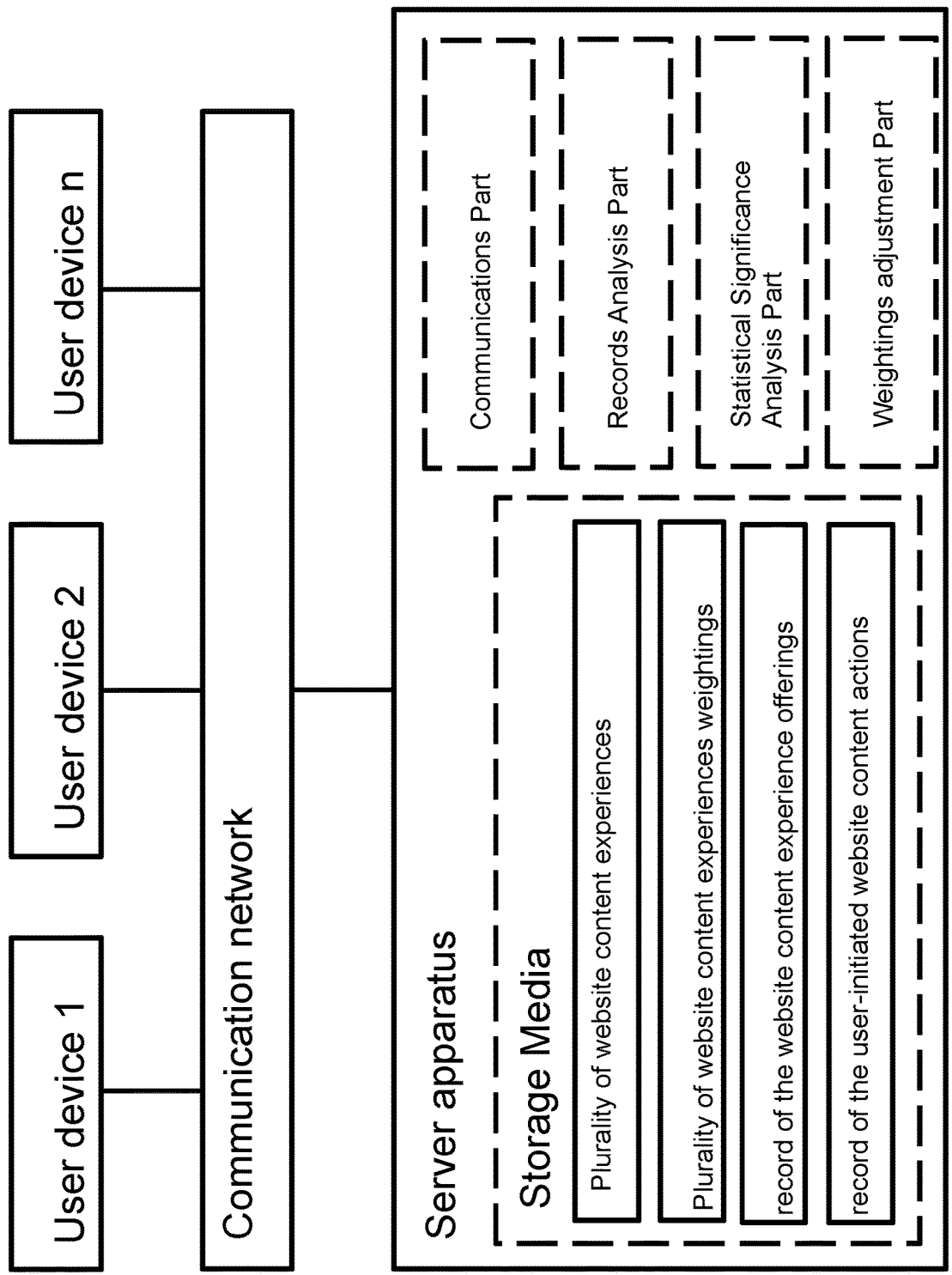
FIG. 17 shows an example of a system comprising a server apparatus, a communication network, and a plurality of user computing devices.

The method may be provided according to a system; an example of such a system is shown in FIG. 17. The system includes a server apparatus connected by a communication network to a plurality of user devices. User devices may be detachably connected to the communication network. Examples of user devices include smartphones, tablet computers, laptop computers and desktop computers. Examples of communication networks include the internet, mobile phone networks, fixed line networks, wireless networks, and combinations of these networks. The server apparatus may be a single server, a group of servers, or a virtual server system hosted in the Cloud, for example. The server apparatus may comprise storage media, a communications part, a records analysis part, a statistical significance analysis part, and a weightings adjustment part. The storage media may store a plurality of website content experiences, a plurality of website content experiences weightings, a record of the website content experience offerings, and a record of the user-initiated website content actions.

Self-Adapting Content Optimization

Overview

In an example, Self-Adapting Content Optimization (SACO) is a fully automated and self-learning methodology for website content optimization, which improves the selection of website content variants based on their statistical performance as obtained from the analysis of visitors' clickstream data. Here we explain aspects of the wider context and specific technical innovation that the SACO algorithm introduces in the solution of the website optimization problem for the purposes of online content optimization eg. marketing.

Main Features of Method

The main features of SACO address the problems identified in the Technical Background section by providing a high-level and fully-automated method of improving the selection of element combinations or online visitor 'experiences' according to their relative performance. In particular, the method makes intelligent decisions on the best split of 'traffic share' between experiences (i.e., it determines the relative weights of experiences and uses these to partition the total visitor traffic into different segments); it provides a logic for making these decisions in an automated way, taking into account the statistics of the elements' performance; and it does so while minimizing the campaign's total 'cost of learning'.

A high-level feature of the method is that it enables marketers to focus on the results of the optimization campaign without having to run the campaign themselves and risk making decisions which are statistically unfounded. In simple terms, the method allows for a 'set and forget' approach to website content optimization campaigns that ensures the statistical significance of the results.

Broad Description of SACO Methodology

Main Building Blocks of the Method

Diagrammatically, the SACO method sits in-between the data collection and the Content Generation, that is, the Generation of website content according to intelligent decisions made by the method:

1. Strategy block [B1] where the core logic is applied—here the incoming data stream is continuously monitored in terms of content performance and the next-best-actions are decided.
2. Smoother block [B2] where the noise in the data is smoothed out (e.g., statistical outliers in revenue or multiple actions are removed).
3. Predictions block [B3] where the future performance of variants is predicted.
4. Sampling rule block [B4] where the predicted performance is transformed into a 'share of traffic' figure, that is, based on the prediction of future performance the block decides what relative weights to assign to variants.

Figure 1:
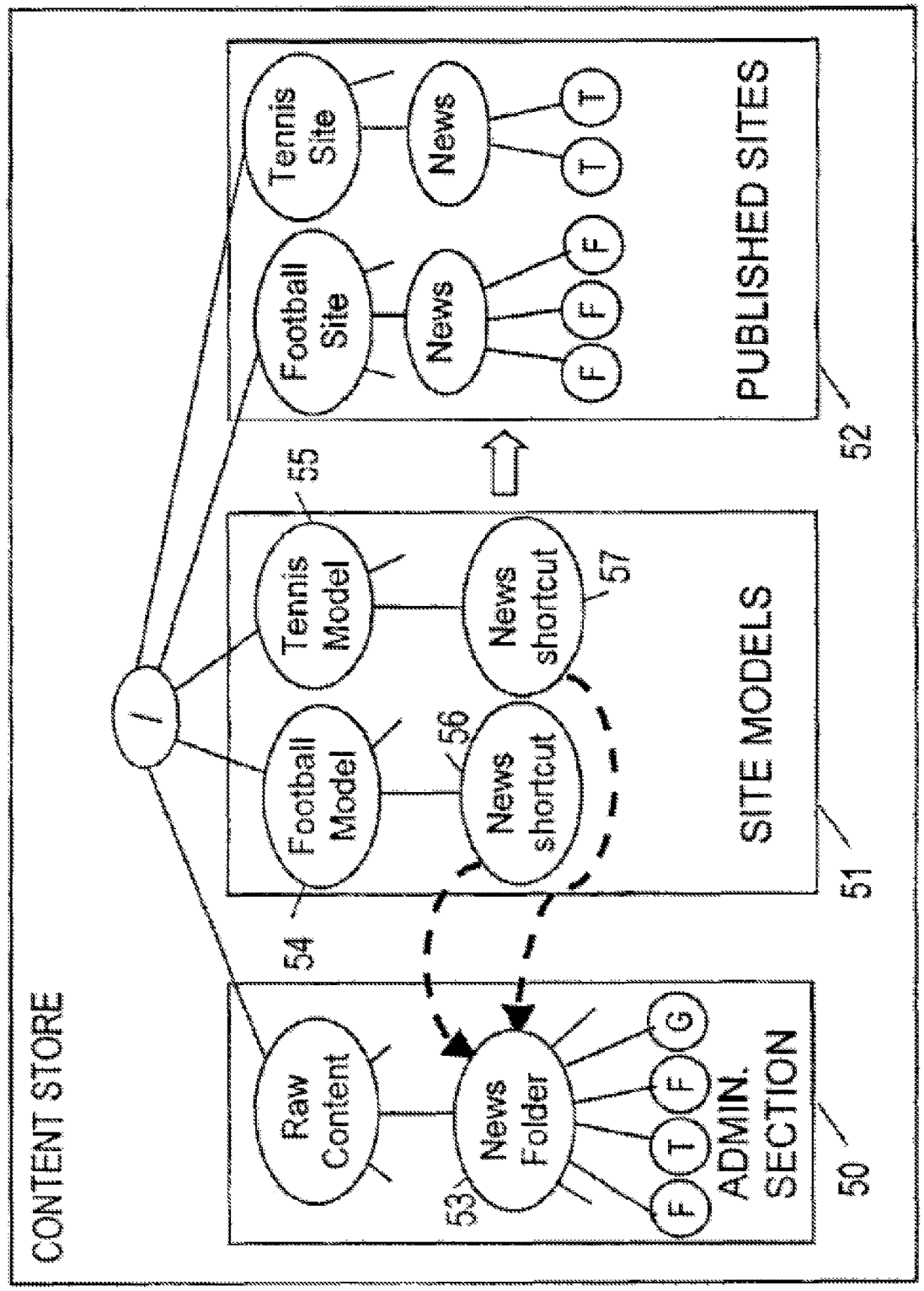
FIG. 1 illustrates the use of active shortcuts to model different websites using the same raw content according to prior art reference EP1146443A2.
Figure 2:
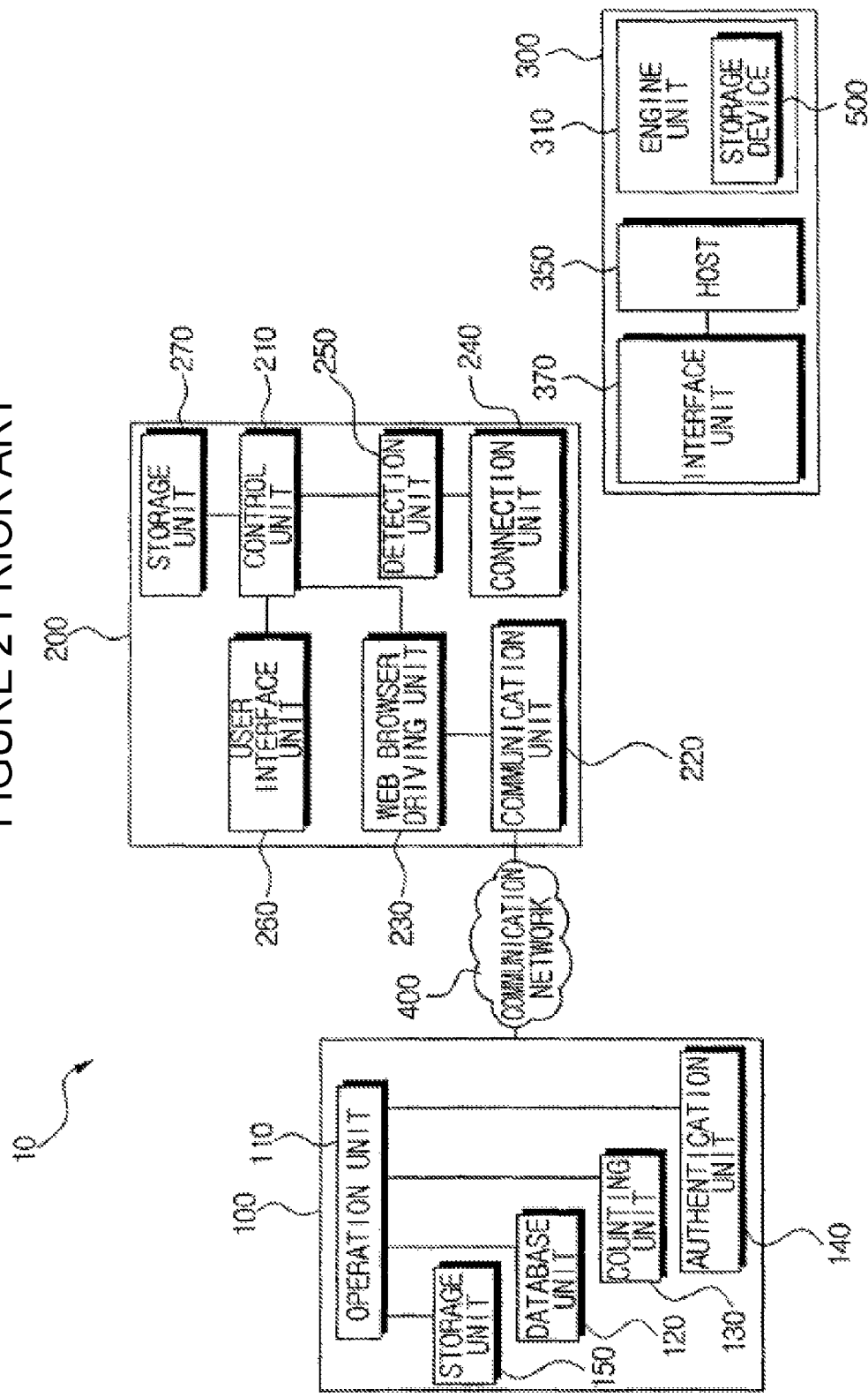
FIG. 2 is a block diagram illustrating a content download system according to prior art reference EP1276295B1.
Figure 3:
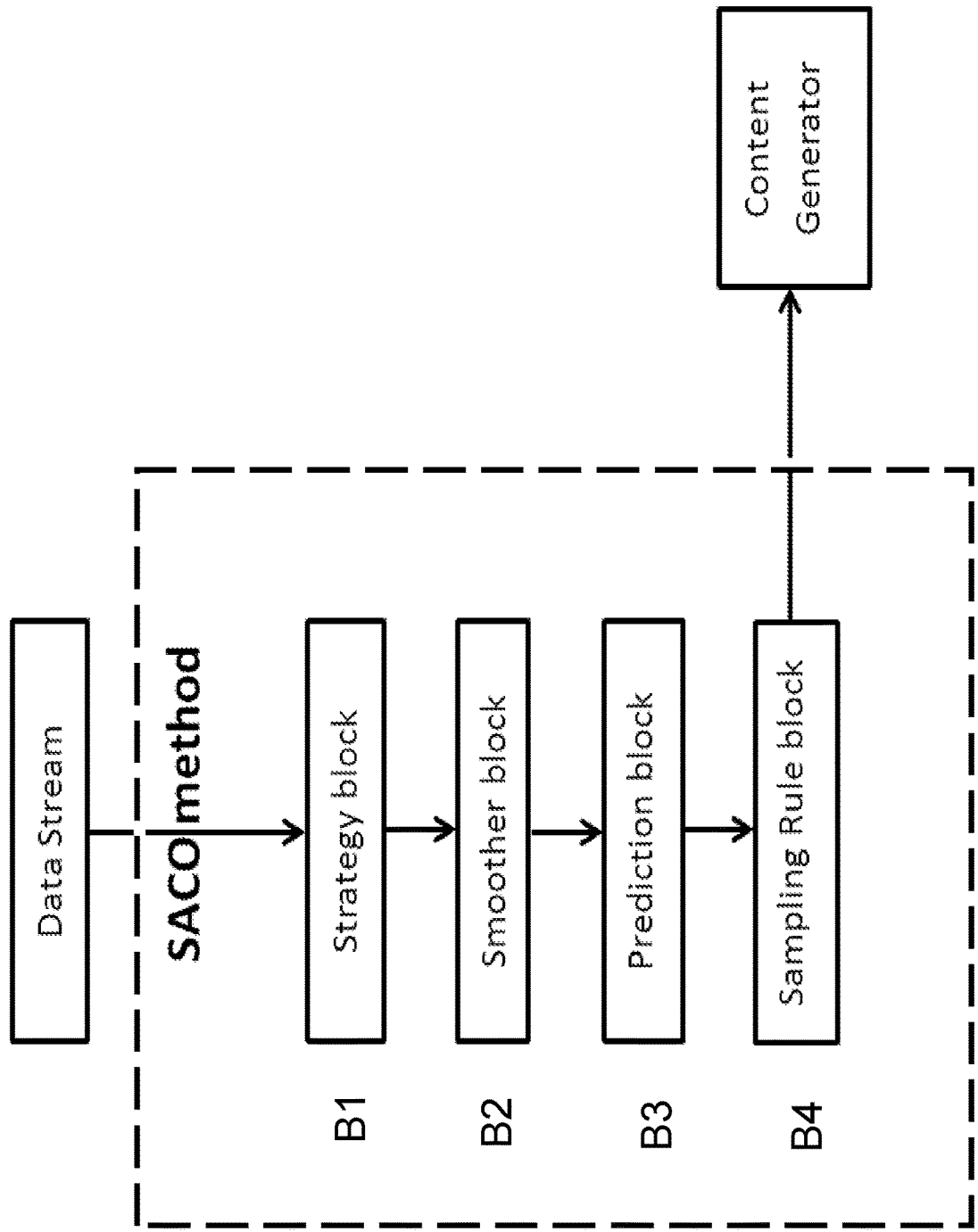
FIG. 3 shows an example of a Self-Adapting Content Optimization (SACO) method which sits in-between the data collection and the Content Generation.

An example is shown in FIG. 3.

Self-Adapting Aggressiveness Sampling

A key ingredient of the SACO methodology rests in the sampling rule block and, in particular, in the way with which the predicted future performance is mapped into a relative weight for each variant. The statistics of the data (such as Margins of Error, results of Z-tests between different variants, etc.) is taken into account when performing such a mapping. For example, taking as an example the case where we are measuring the Conversion Rates (CR) via click-through actions on five different content variants (V1, V2, V3, V4, V5), the transformation of relative performance of this metric into a relative weight of content generation can be done as shown for example in FIG. 4.

Clearly, however, this mapping (or 'sampling') can be done with various levels of aggressiveness: for instance, the worst variant (V1) can be excluded altogether and the winning variant (V5) can be given even more weight. The SACO methodology includes different aggressiveness levels, which are applied in a self-adaptive way given the statistical confidence in the available data so that the scalability and robustness of the method are always safeguarded.

Use Case of the SACO Methodology

The methodology can be applied in the context of multivariable testing (MVT) campaigns, where a number of variants are tested over a certain period of time with the aim of obtaining statistical evidence that one variant is better or worse than another variant in terms of a given metric. For instance, in the following campaign we are testing four different variants on a webpage and the metric is click-through rate (i.e., the proportion of visitors who have clicked on the variant and moved to another webpage). The basic aspects of the SACO method can be seen through this example.

Figure 5:
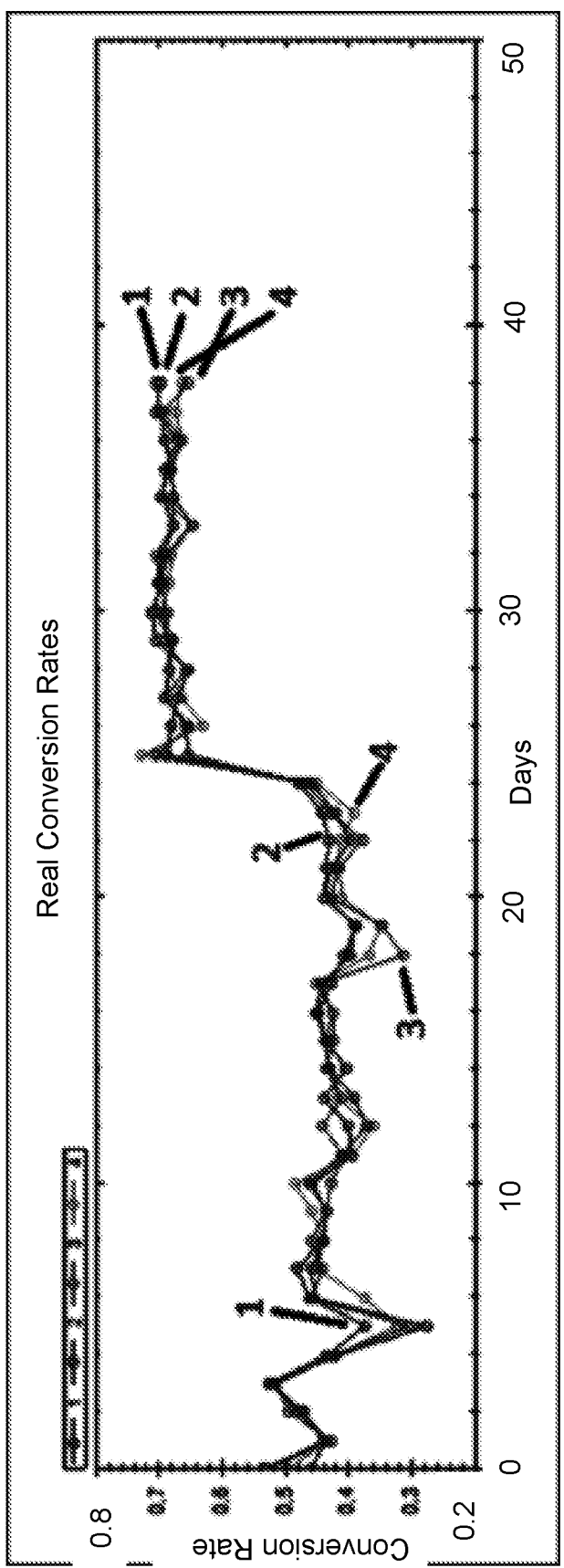
FIG. 5 shows an example of the actual performance of four variants when they were served.

In the graph in FIG. 5 we show the actual performance of the four variants when they were served (i.e., the relevant content was 'generated') with equal weights—what is normally referred to as a full factorial methodology (because all factors are generated equally, please see definitions below).

Over time the cumulative winner is the variant 2 line (variant 2) although on a daily basis there can be other winners and the graph is initially quite volatile. This is a typical situation where the 'manual' rules for optimizing content variants can give the wrong results.

Figure 6:
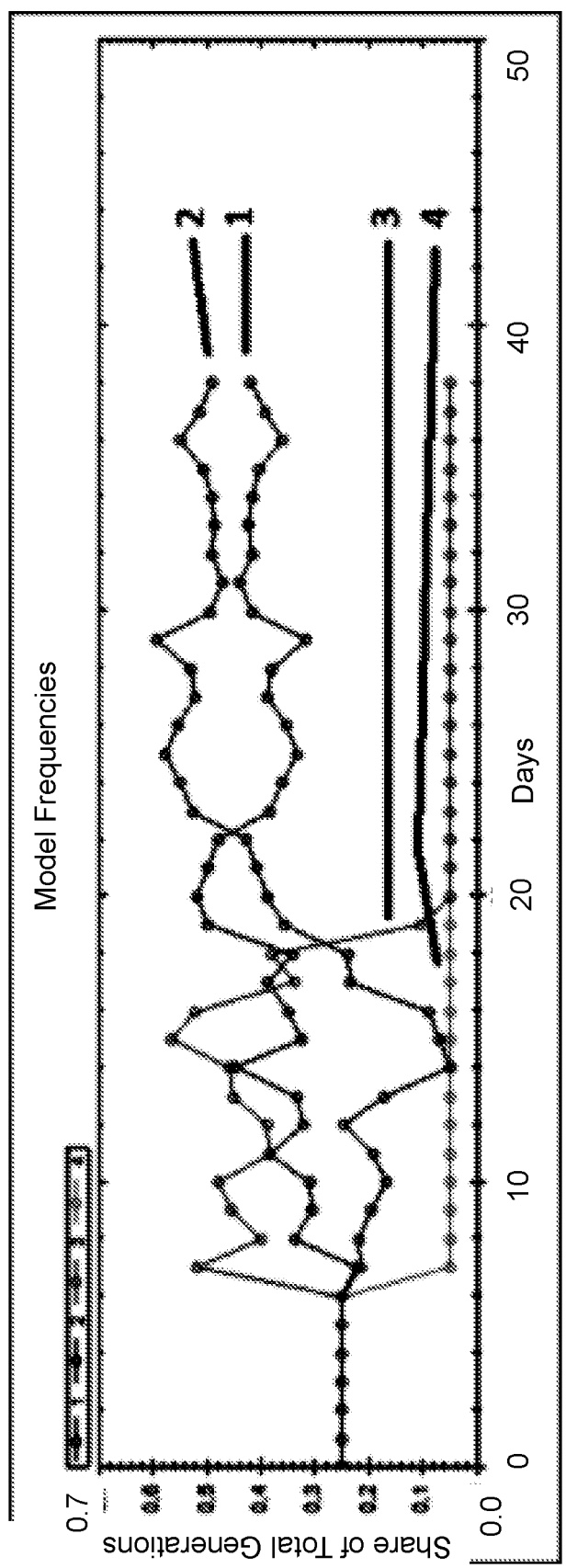
FIG. 6 shows an example of the performance of the same variants as in FIG. 5 under the operation of an example of the SACO model.

In the graph in FIG. 6 we show the performance of the same variants under the operation of the SACO model. In particular, the graph shows the total share of traffic ('share of generations' for each variant) given the performances of the conversion rates in the previous graph. For the first 7 days the variants have equal weights ('learning period') and on the 8th day the SACO aggressiveness controls take over the decision-making process for the share of generations.

In FIG. 6, one can clearly see how the 'winning' variant (in terms of CR, see FIG. 5) is served with a higher weight than the other variants when the SACO methodology is applied. In addition, one can see how the worst-performing variants are 'removed' from the test, that is, their traffic share is brought down to zero weight (FIG. 6, after day 20 there are two such variants).

A SACO method may be applied cyclically in a continuous content optimization algorithm.

Details of an Example of a SACO Algorithm

In this section we provide in-depth details on an example of a SACO mathematical model (the 'model') by providing the corresponding step-by-step algorithm, which lies at its core. We begin with some necessary definitions and background information.

PRELIMINARY DEFINITIONS

Element: A site Element is an identifiable part of a page or site template. In the usual statistical terminology of analysis of variance (ANOVA), this is a 'factor'. (For example, an element can be a landing page image, the size of a banner, or the copy on a call-to-action button.)

Variant: A Variant of an element is a possible configuration of that particular element. There are at least two variants for every element: a Default (or 'control') and at least one Challenger variant. In the usual statistical terminology of ANOVA, this is a 'level'. For example, an element may have two variants which are a small green icon or a large blue icon, for example.

Experience: An Experience is composed of a specific set of Variants over one or more pages. (For instance, a possible Experience can be composed of the combination of a welcome page with the Default image, a non-Default medium size banner, and a call-to-action button with the copy 'View Our Best Offers'.)

Visitor: A Visitor is a site user who enters the campaign (and may be tracked via a 1st-party cookie).

Generation: A Generation (of campaign content) is counted when a Visitor is displayed a particular Experience for the first time. A returning visitor will see the same content that they were shown upon the first generation of content, in an example.

Action: An Action is a conversion event performed by the visitor (e.g., purchase, click-through, registration, download etc.) The Primary Metric tracks the Actions, as chosen at the start of the campaign.

Single Action Count (or 'Single Actions'): Single Actions are the total number of Visitors who have completed a specified Action for a given Experience. The Single Action Count is less than or equal to the Generation Count.

Multiple Action Count (or 'Multiple Actions'): Multiple Actions are the total number of Conversion Events that have been completed for a given Experience. The Multiple Action Count is at least as much as the Single Action Count. It is possible for the Multiple Actions to be more than the Generation Count.

Conversion Rate: The Conversion Rate (CR) is given by the ratio of total Single Actions over content Generations for that Experience, i.e., CR=Single Actions/Generations. This ratio is a number between 0 and 1, and is typically multiplied by 100 so that it is expressed as a percentage.

Primary Metric: The Primary Metric is the objective function, towards which the model optimizes. For example, it can be the Conversion Rate, Revenue per Generation, or Multiple Actions per Generation.

Error Margin: The Primary Metric of a sample of Visitors is always quoted with the associated Margin of Error ('Error Margin'); for example we say that the Conversion Rate is CR=5%±0.3%, and all other measures of statistical significance are also given.

Error Rate: The ratio of Error Margin/Primary Metric values (i.e., the relative size of the margin of error with respect to the Metric value) is referred to as the Error Rate here.

Uplift: The Uplift is given by the relative difference (expressed as a percentage) in a report's key metric between a given Experience/Variant and the Default (or 'control') content.

Delayed Action Actions that are performed after the first visit to an optimization campaign.

Step-by-Step SACO Algorithm Example

1. [Start of module B1] Depending on the number of Elements to be tested in various combinations (Experiences) on a website, the model decides whether it will optimize by Elements or By Experiences; the decision is made based on the number of Elements: if these are below a certain threshold then the model optimizes by Experiences, which is the preferred, default method.

2. Model extracts daily Generations and daily values of the Primary Metric ('Metric') with Error Margins for all Contents (Elements and Experiences) from the database.

3. Model excludes from the analysis Contents which have poor statistics, i.e., all those Experiences with insufficient number of Generations, high Error Margins or short history length. Model cannot conclude the test ('winner alerts' are disabled) if one or more Contents have been excluded from the analysis at this step.

4. Model converts daily Metric values to Normalized cumulative values.

a. The normalization of the Primary Metric is a necessary transformation because of the continuous resetting of Content weights, which skews the Cumulative Primary Metric;

b. The calculation of the (cumulative) Normalized Primary Metric and its corresponding deviation restores the correct ranking of Experiences in the optimization campaign (step 5);

c. As an illustration, the Conversion Rate (CR) is renormalized in the following way:

i. Let $p[i]$ be the CR value of Content on day i; and let $G[i]$ be the number of Generations on day I; then the Normalized CR is given by ii. (Normalized Conversion Rate of Content on day N)=(sum of $p[i]*G[i]$ over days $i=1, 2 \ldots N$) (Total Generations over N days).

5. Model ranks Contents according to cumulative value of Primary Metric in descending order.

6. Model compares each and every one of the Contents against top-ranked Content and decides if it can be removed from campaign.

a. Content is removed if its Metric has small Error Rate and statistical confidence in the fact that Winner has higher Metric value is sufficiently high.

i. We remove Content X from the ranked list of all Contents if it is last on the list (i.e., ranked below all other contents) and its Z-score with respect to the Winner Content (i.e., the content at the top of the list) is greater than 1.96 (given that the chosen confidence level is 95%, which is the default setting).

b. If content is removed it is assigned zero weight (within Optimized Channel only) and does not participate in the next steps. [END of module B1]

7. [Start of module B2] Model extracts daily Generations and daily values of Primary Metric (with error margins) for all Contents from the database, but filters out Actions which were committed during the last 24 hours.

a. Generation filter is necessary as next steps involve time series prediction and the goal is to eliminate trends caused by delayed actions.

8. Model performs smoothing of the time series using standard low-pass filtering algorithm.

a. Clearly, the evolution in time of the Primary Metric's values can be treated as a time series—this is the starting point of this step;

b. Consequently, this time series can be smoothed or transformed as required, according to standard time series analysis techniques;

c. The default option used by the SACO model is the '1-2-4-2-1' weight combination for smoothing, but there are many other options available. [END of module B2]

9. [Start of module B3] Model (on day N) predicts Metric value for the next day, N+1.

a. Metric value for day N+1 is set to the average of Metric values for previous N days.

10. Model finds prediction error for all Contents by doing prediction for current day and all previous days and averaging difference between prediction and real value over all previous days.

11. Model calculates average Metric value among all Contents and uses this average point to split all Contents into three separate groups, depending on their relative position to this point:

a. Group A: Contents in this group have higher than average metric by a value which is higher than prediction error for this content;

b. Group B: Contents in this group have smaller than average metric by a value which is higher than prediction error for this content;

c. Group C: Contents in this group have values within the inclusive set interval [Average−Prediction Error, Average+Prediction Error]. [END of module B3]

12. [Start of module B4] Model determines the Aggressiveness Parameter to be used in following steps.

a. Model extracts from the database daily values of Uplift of Optimized traffic against Control traffic for all previous days (on a cumulative basis).

b. Aggressiveness parameter is determined based on the daily Uplifts:

i. For each day with positive uplift Aggressiveness increases by fixed amount;

ii. For each day with negative uplift Aggressiveness decreases by fixed amount;

iii. Aggressiveness has predefined starting, maximum and minimum values;

iv. Aggressiveness conventionally takes real values from interval [1, 2].

13. Aggressiveness parameter is used to convert predicted Metric values into Content Weights.

a. For Group A: Weight of each Content is multiplied by Aggressiveness parameter;

b. For Group B: Weight of each Content is divided by Aggressiveness parameter;

c. For Group C: Weight of each Content is assumed to be equal to average weight.

14. Predictions of weights for Contents which had zero weight during several last days are multiplied by a damping coefficient D, which takes values from the unit interval.

15. Contents which were excluded from analysis at step 3 can re-enter the analysis at this stage.

a. All such Content weights have an equal value, which is calculated according to following logic:

i. Contents are generated according to equally weighted Full Factorial method in a separate, virtual, traffic channel;

ii. Relative size of this channel equals to the ratio of excluded Contents count to the total Contents count.

16. Weights are normalized by dividing each weight by the sum of weights.

17. Normalized weights are used in random (Monte-Carlo) sampling to generate content for each new visitor.

a. Additional information about this step is provided at the end of this section.

18. Model uses normalized cumulative data to check if it can conclude the test (generate alert), according to the following Alert Types:

a. 'Winner Found' Alert is generated if statistical confidence of the fact that top-ranked Content is better than all other Contents has been high for M last days;

b. 'No Winner' Alert is generated if statistical confidence of the fact that top-ranked Content is better than second-ranked content has been small for M last days, and both Contents have small Metric relative errors;

c. If model is unable to issue alert with given confidence and optimization campaign has been running for more than Q days, the model issues similar alerts but with smaller statistical confidence.

d. When an alert is issued, the model continues to optimize as normal, but the marketer can choose to end the optimization campaign by serving the Winner or any other Content. [END of module B4]

[END of SACO algorithm]

Real-Time Visitor Attribute Targeting Example

The visitor cookie of every Visitor coming into the optimization campaign contains additional information, which can be used to perform more intelligent optimization in real time. This is an optional feature of the SACO methodology that is not meant to personalize or target the visitor experience, but is only aiming to leverage certain common attributes of visitors, on aggregate, in order to achieve the overall optimization goals faster and better.

In particular, it is often the case that online businesses with high seasonality have groups of visitors (visitor segments), who tend to perform differently with respect to certain attributes. For instance, it is possible that—on average—visitors to a website purchase more items and more often during weekends as compared to weekdays.

This information can be leveraged by the SACO methodology to enhance the optimization process without affecting the statistical validity of the test results. This is done by performing the generalized method over a number of non-intersecting segments and over a very specific set of attributes (such as, typically, time of day or day of week). This means running several independent offline models, which use data only from corresponding segment, while online modules serve incoming visitors with weights which are valid for their segment.

Additional information on Step 17

We let a. A—total number of actions;

b. N—number of contents;

c. E—arbitrary content;
d. μ—cumulative Total Normalized Metric;
e. μ(E)—cumulative Normalized Metric for content (Experience) E;
f. σ—normalized standard deviation of Total Metric;
g. σ(E)—normalized standard deviation of Metric of content E;
h. CI(E, E')—Confidence Index of content E being better than content's E';
i. $CI^{-d}$(E, E')—Confidence Index of content E being better than content's E' measured d days ago.

By Confidence Index we essentially mean the Z-score calculation showing that the first content is different from (behaves better or worse than) the second content.

By Relative Error (denoted by err(E)) we understand the variation of Content Metric (ratio of Metric deviation σ(E) to Metric value μ(E));

By D we understand the day (from the beginning of the test) that satisfies the following criteria:

$$D \geq 3$$

$$\text{err(Total)} \cdot \sqrt{N} \leq 30\%$$

Finally,

Specific criteria for firing Alerts are presented in the table in FIG. 7.

We distinguish between strong (type 1) and weak (type 2) alerts. Model consecutively (from left to right) checks possibility of issuing alerts of these types. See FIG. 7 for example.

Examples of Detail, Infrastructure and Implementation

Figure 8:
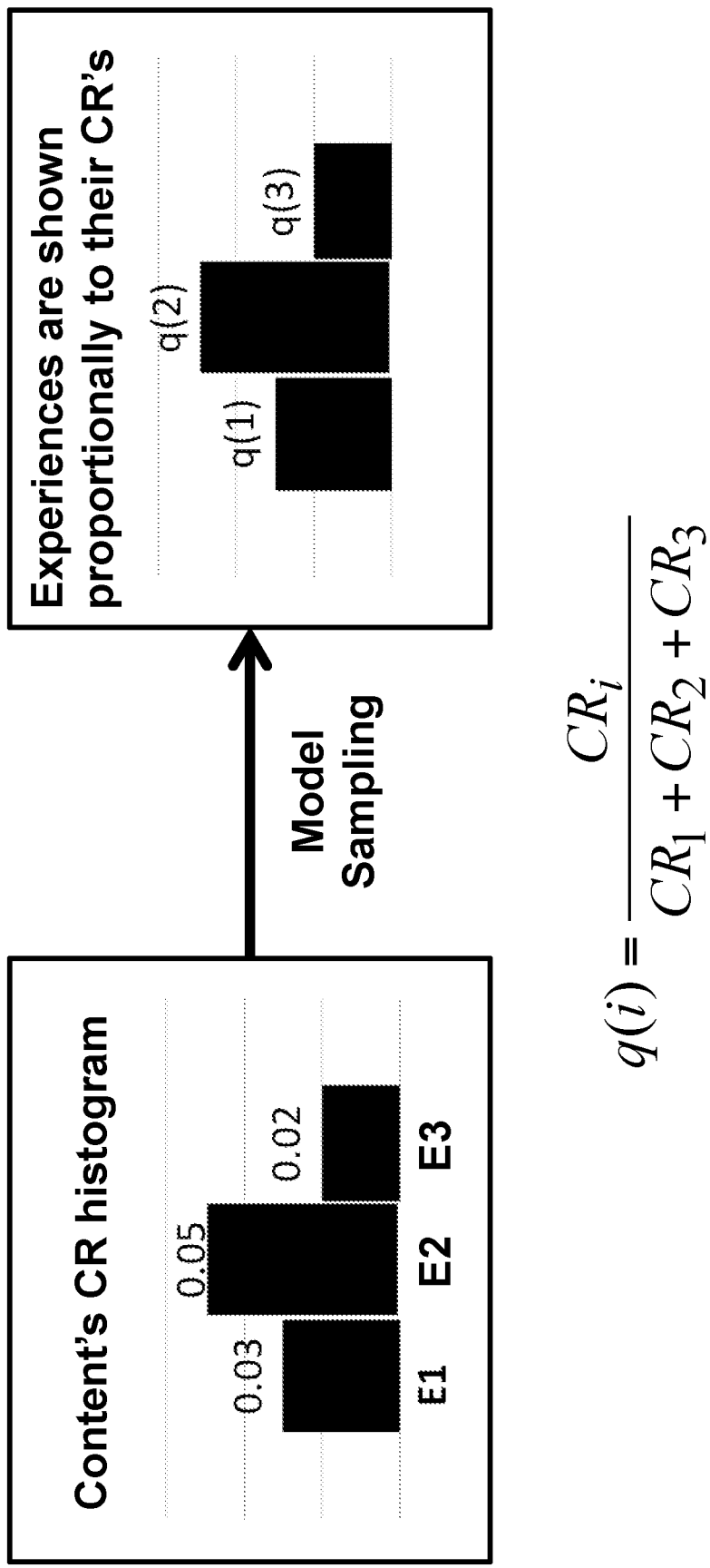
FIG. 8 shows an example of basic sampling in SACO, without aggressiveness.

In an example of basic sampling in SACO, without aggressiveness, experiences are shown proportionally to their CR's. An example is shown in FIG. 8.

Figure 9:
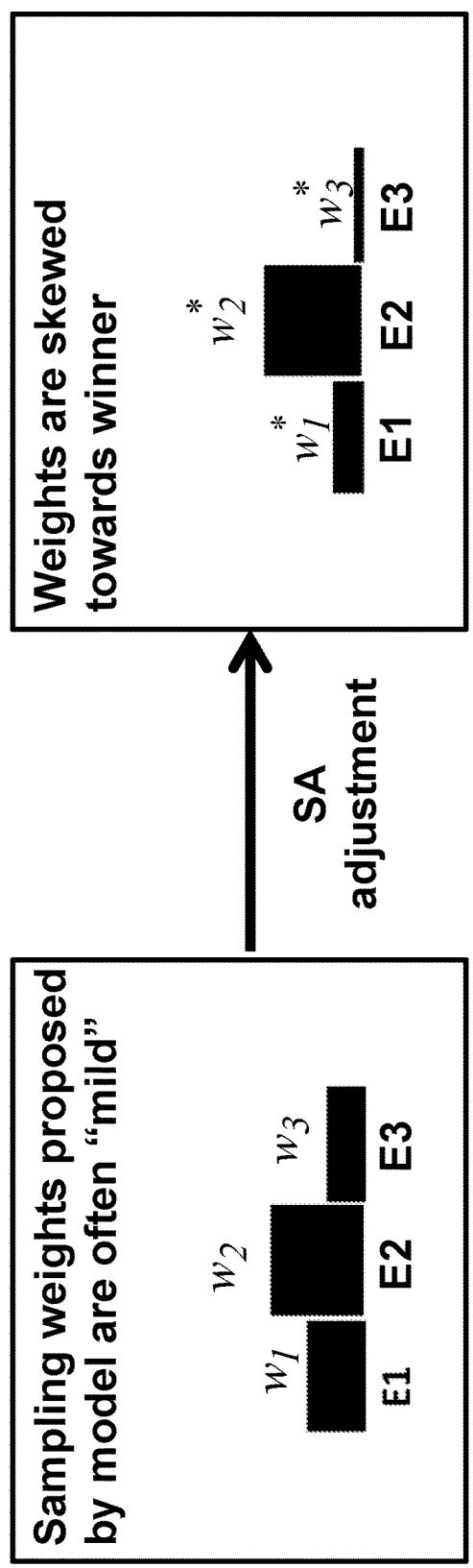
FIG. 9 shows an example of sampling in SACO, in which sampling aggressiveness adjustment is provided, and examples of aggressiveness modes.

In a further example of sampling in SACO, sampling aggressiveness adjustment is provided. In this example, sampling aggressiveness is adjusted so that weights are skewed towards a winner. An example is shown in FIG. 9, in which the sampling weights are skewed in favour of the winner, E2. Various aggressiveness modes are possible, as shown for example in FIG. 9. Example aggressiveness modes are: aggressive, remove loser, remove more losers, and winner only. Example formulae describing Weighting transformation formulae suitable for the aggressiveness modes aggressive, remove loser, remove more losers, and winner only, are shown in FIG. 9.

Figure 10:
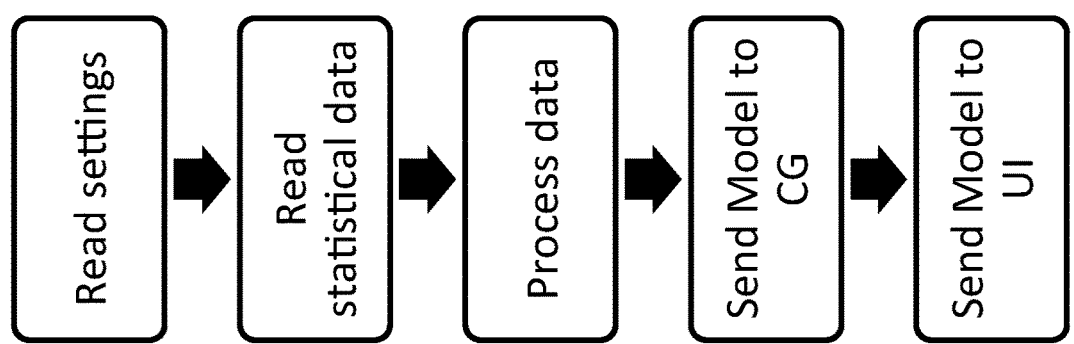
FIG. 10 shows an example of a simplified workflow.

An example of a simplified workflow is shown in FIG. 10. In FIG. 10, "UI" is user interface, and "CG" is content generator.

Figure 11:
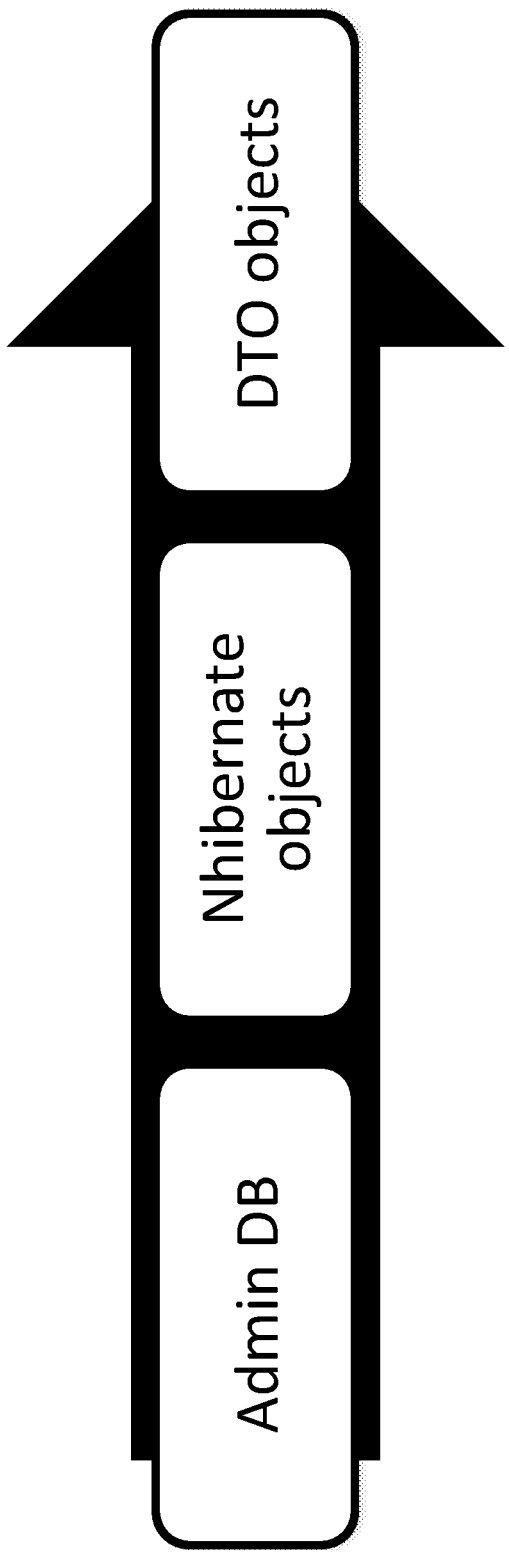
FIG. 11 shows an example flow from admin database to Nhibernate objects to Data transfer object (DTO) objects.

In an example of reading settings, reading settings includes using a configuration file and an admin database. The configuration file includes a connection string and included/excluded domains, servers, and model types. The admin database includes a connection string to a reporting database (in an example it uses only Online analytical processing (OLAP)), and a Campaign structure: elements, variants, experiences, and primary action. A robot works with the Admin database through Nhibernate. An example flow from admin database to Nhibernate objects to of Data transfer object (DTO) objects is shown in FIG. 11.

FIG. 12 shows an example of Data transfer object (DTO) objects.

Figure 13:
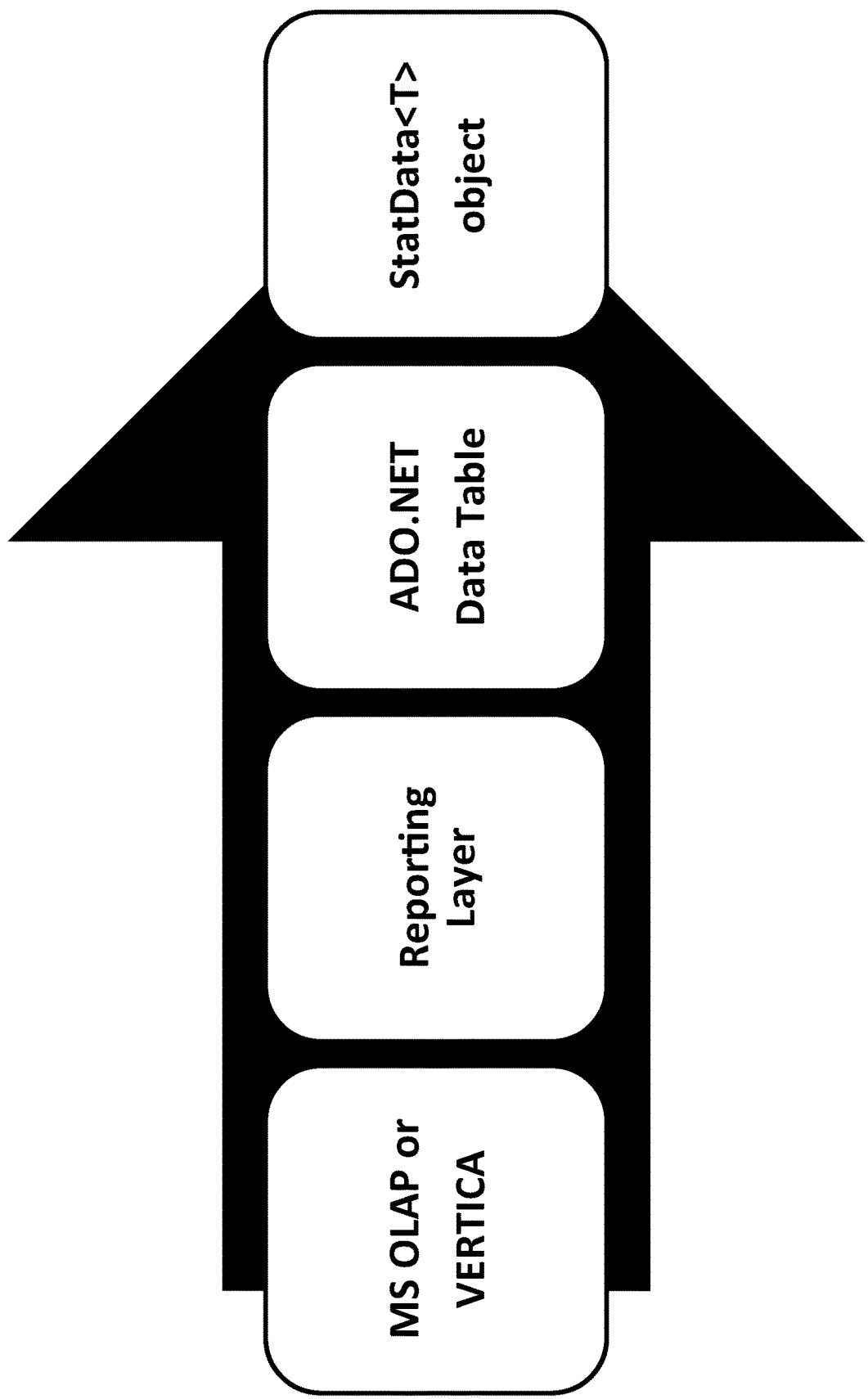
FIG. 13 shows an example of statistical data flow.

In an example, statistical data flow is from Microsoft (MS) OLAP or VERTICA, through a reporting layer, to an ADO.NET data table, to a StatData<T> object. FIG. 13 shows an example of statistical data flow.

ADO.NET is a set of computer software components that programmers can use to access data and data services based on disconnected DataSets and Extensible Markup Language (XML). It is a part of the base class library that is included with the Microsoft .NET Framework. It is commonly used by programmers to access and modify data stored in relational database systems, though it can also access data in non-relational sources.

Examples of database queries include 'get content stat' and 'get attribute stat' (eg. for each of 41 attributes). An example of 'get content stat' is shown in FIG. 14A. An example of 'get attribute stat' (eg. for each of 41 attributes) is shown in FIG. 14B.

An example of a StatData<T> object explanation is shown in FIG. 15.

Figure 16:
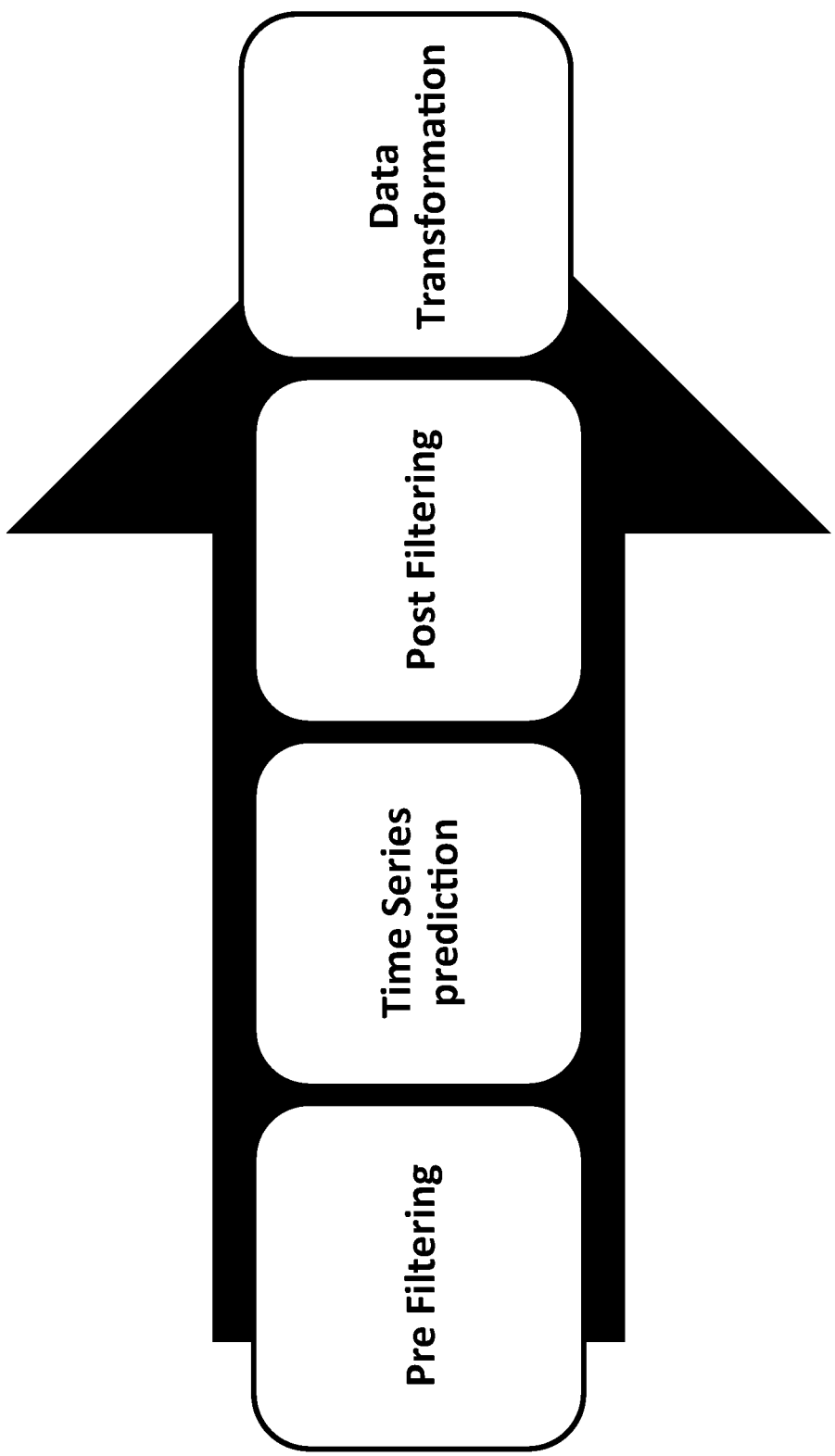
FIG. 16 shows an example of a data processing flow.

In an example of a data processing flow, a prefiltering is performed to clean noise in data, then a time series prediction is performed to estimate the performance of variants on the next day, then post filtering is performed to obtain suitable weights for variants, and finally weights normalization is performed. An example of a data processing flow is shown in FIG. 16.

Figure 18:
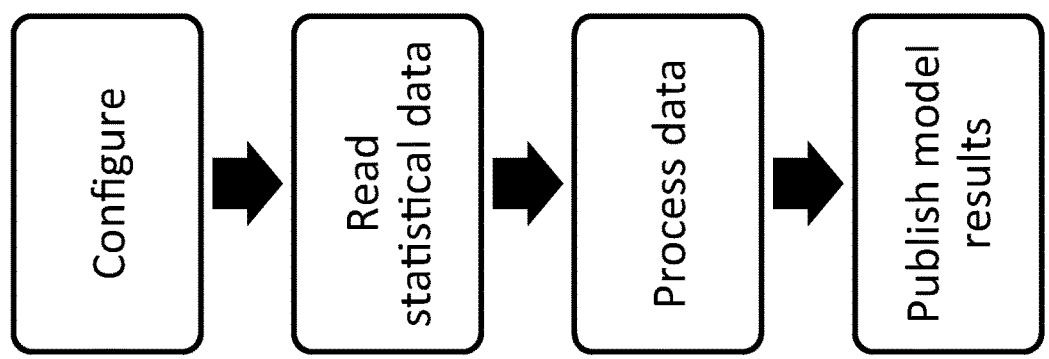
FIG. 18 shows an example of a simplified workflow.

An example of a simplified workflow is as follows. In a first stage, a configuration is performed. In a second stage, statistical data is read. In a third stage, data is processed. In a fourth stage, model results are published. An example of a simplified workflow is shown in FIG. 18.

Figure 19:
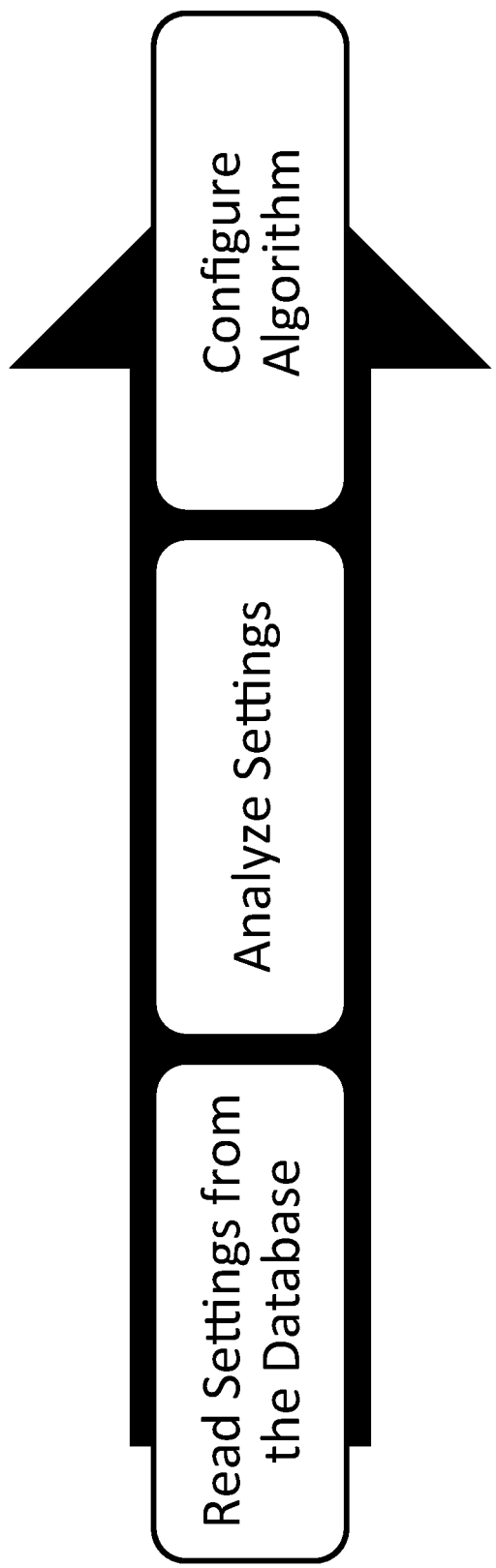
FIG. 19 shows an example of a configuration step.

In an example of a configuration step, settings are read from a database, then the settings are analysed and finally an algorithm is configured based on the results of the analysis. The algorithm is divided into multiple independent blocks. Most of the blocks can have several implementations. When configuration is analyzed, a particular implementation of each block with all constants and settings is chosen among many possible choices. The overall design of the application is built according to Inversion of Control pattern. An example of a configuration step is shown in FIG. 19.

Figure 20:
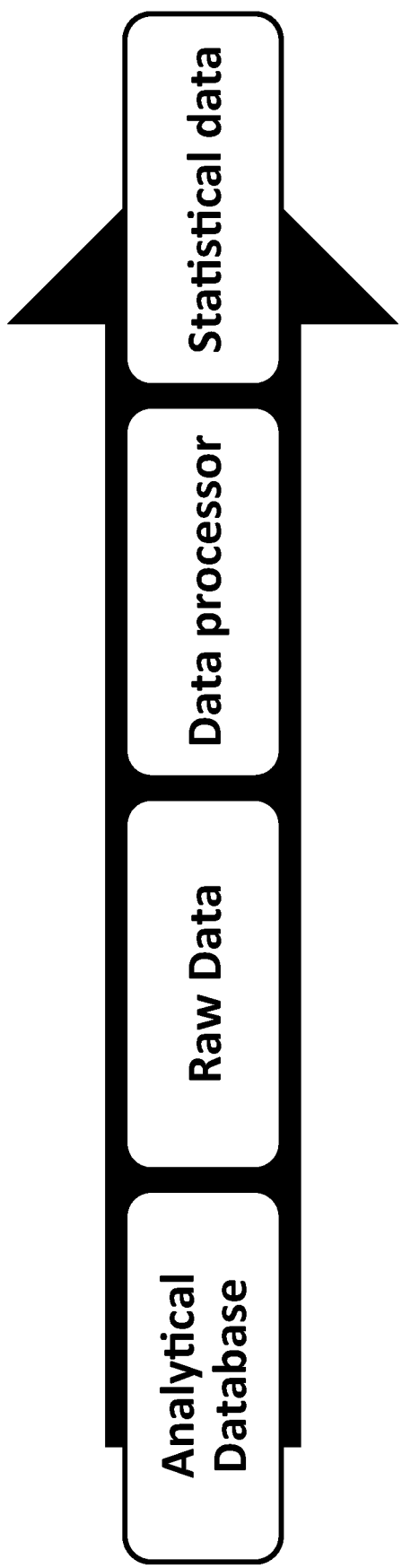
FIG. 20 shows an example of a statistical data reading stage.

In an example of a statistical data reading stage, an analytical database is looked up. Raw data is obtained from the analytical database. The raw data is fed to a data processor, which generates statistical data as an output. An example of a statistical data reading stage is shown in FIG. 20.

In an example of data structure for raw data, content is referenced by a content ID, data is structured by day number, and each day number contains data items and values, such as Actions/Revenue=10, Generations=100, and Revenue Squared=20, for a specific content ID. An example of data structure for raw data is shown in FIG. 21.

Figure 22:
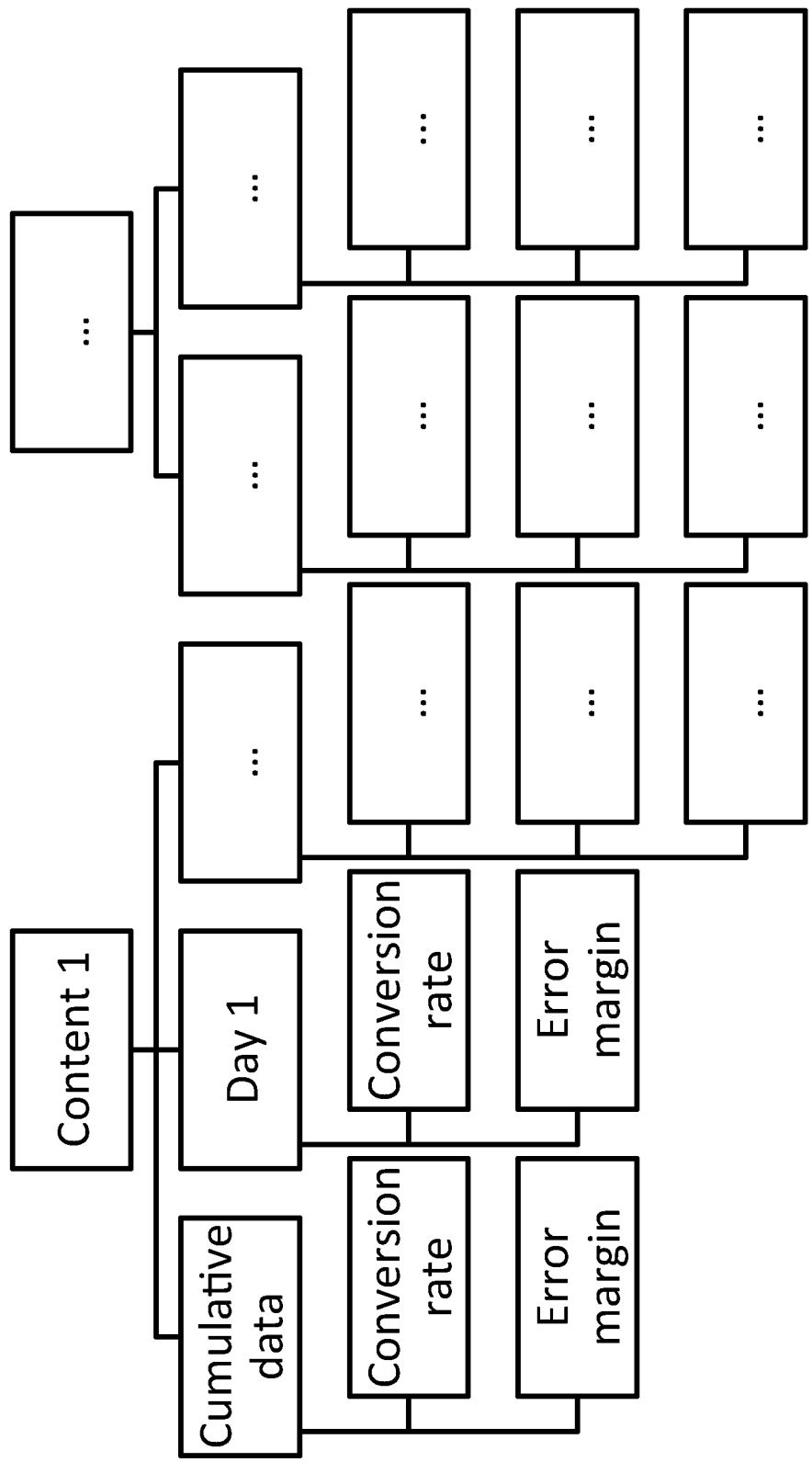
FIG. 22 shows an example of a data structure for statistical data.

In an example of data structure for statistical data, content is referenced by a content ID, and data associated with that content ID is structured into cumulative data, and data by day number. Cumulative data is structured into conversion rate data and error margin data, etc. Data by day number is structured into conversion rate data and error margin data, etc. An example of data structure for statistical data is shown in FIG. 22.

Figure 23:
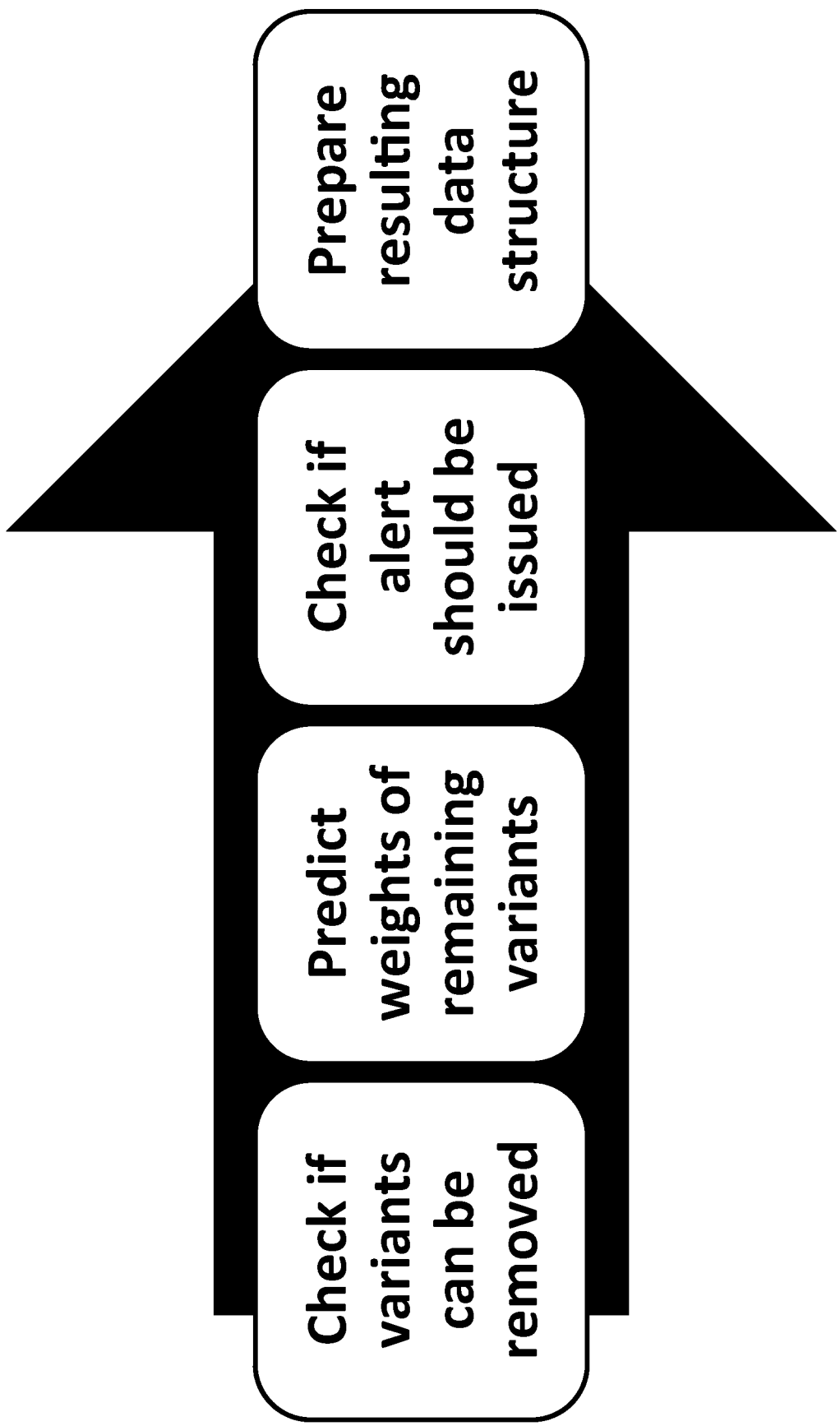
FIG. 23 shows an example of a data processing stage.

In an example of a Data Processing stage, in a first step a check is performed if variants can be removed, and if they can be removed they are removed. In a second step, the weights of the remaining variants are predicted. In a third step, a check is performed if one or more alerts should be issued, and if they should be issued, they are issued. In a fourth step, the resulting data structure is prepared. An example of a Data Processing stage is shown in FIG. 23. In an example of a resulting data structure, the Weights for ALL contents are given by: Content 1: 0.0; Content 2: 0.0; Content 3: 0.75; Content 4: 0.25. Examples of alerts are: Winner has been found: Content 3, OR No Winner, OR No Alert, test should be continued.

In an example of a publish model stage, Weights are used for content sampling, and an Alert is used to notify a user and is displayed in the UI.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

Concepts

There are multiple concepts, described as concepts 'A-D', in this disclosure. The following may be helpful in defining these concepts. Aspects of the concepts may be combined.

A. Method of Operating a Server Apparatus for Delivering Website Content to a Plurality of Computer Devices There is provided a method of operating a server apparatus for delivering website content to a plurality of computer devices, via a communication network, the server apparatus configured to receive user-initiated website content actions from the plurality of computer devices, the method comprising the steps of:

(i) generating and storing a plurality of website content experiences, and storing a respective weighting for each experience;

(ii) offering the stored website content experiences via the communication network, each website content experience being offered in accordance with its respective stored weighting, and storing a record of the website content experience offerings;

(iii) receiving at the server apparatus user-initiated website content actions from the plurality of computer devices;

(iv) storing a record of the user-initiated website content actions from the plurality of computer devices in relation to the website content experience offered;

(v) analysing the record of the user-initiated website content actions from the plurality of computer devices in relation to the record of website content experience offerings to determine a frequency of website content experience actions in relation to a frequency of website content experience offerings;

(vi) adjusting the respective stored weighting of a website content experience in response to the determined frequency of website content experience actions in relation to the frequency of website content experience offerings satisfying a criterion and an associated statistical significance criterion.

Further aspects of the method may be as follows. Aspects of the method may be combined.

website content includes elements, each element having at least two variants.

each experience comprising a specific set of variants, over one or more web pages.

the weightings are set to an equal weight for a predetermined initial period, after which adjustment of the weightings in step (vi) is permitted.

comprising the further step of: offering the stored website content experience via the communication network, each website content experience being offered in accordance with its adjusted respective stored weighting.

including a predictions step in which the future performance of experiences is predicted, and the method including a sampling rule step in which the predicted performance is transformed into a 'share of traffic' figure, that is, based on the prediction of future performance the sampling step decides what relative weights to assign to experiences.

aggressiveness is applied in the adjustment of a respective stored weighting of a website content experience.

aggressiveness includes excluding a worst experience or worst variant.

aggressiveness includes a winning experience or winning variant receiving even more weight.

sampling aggressiveness is adjusted so that weights are skewed towards a winner experience or winner variant.

an aggressiveness mode is one of: aggressive, remove loser, remove more losers, and winner only.

the method determines an aggressiveness parameter to be used in adjusting the weightings for website content experiences.

an aggressiveness parameter value has predefined starting, maximum and minimum values.

an aggressiveness parameter is used to convert predicted Metric values into Content Weights.

for each cycle of the method with positive uplift, the aggressiveness parameter is increased by a fixed amount, where uplift is given by the relative difference in a report's key metric between a given experience or variant and a default content.

for each cycle of the method with negative uplift, the aggressiveness parameter is decreased by a fixed amount, where uplift is given by the relative difference in a report's key metric between a given experience or variant and a default content.

worst-performing experiences or worst-performing variants are given zero weighting.

if worst-performing experiences or worst-performing variants are given zero weighting, the corresponding content is removed and does not participate in the next steps.

every visitor accessing the server apparatus has a visitor cookie, which is received by, and stored on the corresponding computing device.

the method includes performing a generalized method over a number of non-intersecting segments and over a specific set of attributes, wherein visitors are grouped into segments, and running several independent offline models, each using data only from a corresponding segment, while online modules serve incoming visitors with weights which are valid for their segment, where visitor cookies are used to define segments.

a generation of campaign content is counted when a visitor is displayed a particular experience for the first time.

a returning visitor will see the same content that they were shown upon the first generation of content.

the criterion is optimizing Conversion Rate, Revenue per Generation, or Multiple Actions per Generation.

the method includes a step in which it is decided whether to optimize by elements or by experiences.

if the number of elements is below a predefined threshold then the method optimizes by experiences.

a Primary Metric tracks the actions, as chosen at the start of the campaign.

the method including a step of extracting cyclically generations and daily values of the Primary Metric with Error Margins for all contents, elements and experiences, from a stored database.

the method including a step of ranking Contents according to cumulative value of Primary Metric in ascending or descending order.

the method including a step of comparing each and every one of the Contents against top-ranked Content and deciding if it can be removed from a campaign.

the method including a step of performing smoothing of time series data using a low-pass filtering algorithm.

Steps (ii) to (vi) of the method are applied in cycles so as to provide continuous content optimization.

the method being applied in cycles, wherein on cycle N the method includes a step of predicting a Metric value for the next cycle, N+1.

a cycle duration is a day.

the method is fully automated and self-learning for website content optimization.

the method improves a selection of website content variants based on their statistical performance as obtained from the analysis of visitors' clickstream data.

the method is a method of improving the selection of element combinations or online visitor 'experiences' according to their relative performance.

the method makes intelligent decisions on the best split of 'traffic share' between experiences.

the method minimizes a campaign's total 'cost of learning'.

There is further provided a server apparatus configured to perform a method according to any of the above statements.

There is further provided use of a method according to any of the above statements, in the context of a multivariable testing campaign.

There is further provided use of a method according to any of the above statements, for the purposes of online marketing.

There is further provided a computer program product stored on a non-transient storage medium, the computer program when running on a server apparatus operable to perform the methods of any the above statements.

B. Method of Adjusting a Respective Stored Weighting of a Website Content Experience There is provided a method of adjusting a respective stored weighting of a website content experience for operating a server apparatus for delivering website content to a plurality of computer devices, via a communication network, the server apparatus receiving user-initiated website content actions from the plurality of computer devices, in which there are generated and stored a plurality of website content experiences, and a respective weighting is stored for each experience, in which the stored website content experiences are offered via the communication network, each website content experience being offered in accordance with its respective stored weighting, the method comprising the steps of:

(i) storing a record of the website content experience offerings;

(ii) receiving at the server apparatus user-initiated website content actions from the plurality of computer devices;

(iii) storing a record of the user-initiated website content actions from the plurality of computer devices in relation to the website content experience offered;

(iv) adjusting a respective stored weighting of a website content experience in response to the determined frequency of website content experience actions in relation to the frequency of website content experience offerings satisfying a criterion and an associated statistical significance criterion.

Further aspects may be as follows:

The step of analysing the record of the user-initiated website content actions from the plurality of computer devices in relation to the record of website content experience offerings to determine a frequency of website content experience actions in relation to a frequency of website content experience offerings.

Any aspect of concept A.

C. Server Apparatus Configured to Deliver Website Content to a Plurality of Computer Devices Server apparatus configured to deliver website content to a plurality of computer devices, via a communication network, the server apparatus configured to receive user-initiated website content actions from the plurality of computer devices, the server apparatus configured to:

(i) generate and store a plurality of website content experiences, and to store a respective weighting for each experience;

(ii) offer the stored website content experiences via the communication network, each website content experience being offered in accordance with its respective stored weighting, and to store a record of the website content experience offerings;

(iii) receive user-initiated website content actions from the plurality of computer devices;

(iv) store a record of the user-initiated website content actions from the plurality of computer devices in relation to the website content experience offered;

(v) analyse the record of the user-initiated website content actions from the plurality of computer devices in relation to the record of website content experience offerings to determine a frequency of website content experience actions in relation to a frequency of website content experience offerings;

(vi) adjust the respective stored weighting of a website content experience in response to the determined frequency of website content experience actions in relation to the frequency of website content experience offerings satisfying a criterion and an associated statistical significance criterion.

Further aspects may be as follows:

Server apparatus is configured to perform any of the methods of concept A.

Server apparatus includes a storage medium and a communications part.

There is further provided use of the server apparatus of any of the above statements by a computer device in communication with the server apparatus.

D. Device for Receiving a Website Content Experience with an Adjustable Weighting Device for receiving a website content experience with an adjustable weighting, the device in communication with server apparatus configured to deliver website content to a plurality of computer devices, via a communication network, the server apparatus configured to receive user-initiated website content actions from the plurality of computer devices, and to provide the website content experience with an adjustable weighting.

Further aspects may be as follows:

Device includes a data storage medium and a unique id stored on the data storage medium, wherein the unique id identifies the device to the server apparatus.

The unique id is placed on the device by the server apparatus.

Device receives a website content experience after an adjustable weighting of the website content experience has been adjusted by the server apparatus.

the server apparatus is configured to:
(i) generate and store a plurality of website content experiences, and to store a respective weighting for each experience;
(ii) offer the stored website content experiences via the communication network, each website content experience being offered in accordance with its respective stored weighting, and to store a record of the website content experience offerings;
(iii) receive user-initiated website content actions from the plurality of computer devices;
(iv) store a record of the user-initiated website content actions from the plurality of computer devices in relation to the website content experience offered;
(v) analyse the record of the user-initiated website content actions from the plurality of computer devices in relation to the record of website content experience offerings to determine a frequency of website content experience actions in relation to a frequency of website content experience offerings;
(vi) adjust the respective stored weighting of a website content experience in response to the determined frequency of website content experience actions in relation to the frequency of website content experience offerings satisfying a criterion and an associated statistical significance criterion.

Server apparatus is configured to perform any of the methods of concept A.

Server apparatus is according to concept C.

Server apparatus includes a storage medium and a communications part.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. One or more non-transitory machine-readable media storing instructions which, when executed by one or more hardware processors, cause optimizing a webpage comprising a plurality of website content elements comprising:
storing a plurality of variants of a first website content element of the plurality of website content elements, and storing a respective weighting for each variant of the plurality of variants of the website content element;
causing display, within a web page, of (a) a particular variant of the plurality of variants of the first website content element and (b) a second website content element;
determining a number of times that the particular variant was displayed based at least in part on said display of the first variant within the web page;
receiving a first user-initiated action directed to the particular variant;
determining an action count corresponding to a number of user-initiated actions directed to the particular variant based at least in part on the first user-initiated action;
determining a ratio of (a) the action count corresponding to the number of user-initiated actions directed to the particular variant to (b) the number of times that the particular variant was displayed;
adjusting the respective stored weighting of the particular variant based on the ratio of (a) the number of user-initiated actions directed to the particular variant to (b) the number of times that the particular variant was displayed;
selecting the particular variant from among the plurality of variants for displaying the first website content element based on the adjusted respective stored weighting of the particular variant; and
presenting the particular variant for displaying the first website content element.

2. The media of claim 1, wherein the respective stored weighting of the particular variant of the website content element is adjusted in response to (a) the action count corresponding to the number of user-initiated actions directed to the particular variant to (b) the number of times that the particular variant satisfied a criterion and (c) an associated statistical significance criterion.

3. The media of claim 1, wherein the respective stored weighting of a particular variant of the first website content element is set to a predetermined weight for a predetermined initial period, after which adjustment is permitted.

4. The media of claim 1, wherein the instructions further cause: subsequent to adjusting the respective stored weighting of the particular variant of the first website content element, selecting, based on the adjusted respective stored weighting, the particular variant for displaying the first website content element.

5. The media of claim 1, wherein the instructions further cause: predicting a future performance of the particular variant of the website content element, and based on the predicted future performance, determining respective weighting to assign to the variant of the first website content element.

6. The media of claim 1, wherein the instructions further cause determining an aggressiveness parameter to be used in adjusting the respective weighting for the particular variant of the first website content element.

7. The media of claim 6, wherein determining the aggressiveness parameter is performed cyclically, wherein for each cycle with a positive uplift, the aggressiveness parameter is increased by a fixed amount, where uplift is given by a relative difference in a metric value for the particular variant of the first website content element and a metric value for a default content.

8. The media of claim 6, wherein determining the aggressiveness parameter is performed cyclically, wherein for each cycle with negative uplift, the aggressiveness parameter is decreased by a fixed amount, where uplift is given by a relative difference in a metric value for the particular variant of the first website content element and a metric value for a default content.

9. The media of claim 1, wherein one or more worst-performing variants of the first website content element are given zero weighting.

10. The media of claim 1, wherein the instructions further cause: (a) assigning a cookie to every visitor of visitors of a website comprising the first website content element, (b) grouping the visitors into segments defined by the cookies, (c) running several independent models, each using data only from a corresponding segment, and (d) assigning a weight to a particular visitor for a particular segment.

11. The media of claim 2, wherein the criterion is optimizing Conversion Rate, Revenue per Generation, or Multiple Actions per Generation.

12. The media of claim 1, wherein the instructions are executed in cycles, wherein on cycle N, the instructions cause predicting a Metric value for the next cycle, N+1.

13. The media of claim 1, further minimizing a total 'cost of learning'.

14. A method for optimizing a webpage comprising a plurality of website content elements comprising:
   storing a plurality of variants of a first website content element of the plurality of website content elements, and storing a respective weighting for each variant of the plurality of variants of the first website content element;
   causing display, within a web page, of (a) a particular variant of the plurality of variants of the first website content element and (b) a second website content element;
   determining a number of times that the particular variant was displayed based at least in part on said display of the first variant within the web page;
   receiving a first user-initiated action directed to the particular variant;
   determining an action count corresponding to a number of user-initiated actions directed to the particular variant based at least in part on the first user-initiated action;
   determining a ratio of (a) the action count corresponding to the number of user-initiated actions directed to the particular variant to (b) the number of times that the particular variant was displayed;
   adjusting the respective stored weighting of the particular variant based on the ratio of (a) the number of user-initiated actions directed to the particular variant to (b) the number of times that the particular variant was displayed;
   selecting the particular variant from among the plurality of variants for displaying the first website content element based on the adjusted respective stored weighting of the particular variant; and
   presenting the particular variant for displaying the first website content element.

15. A system comprising:
   one or more hardware processors;
   one or more non-transitory machine-readable media storing instructions which, when executed by the one or more hardware processors, cause optimizing a webpage comprising a plurality of website content elements, the optimizing comprising:
   storing a plurality of variants of a first website content element of the plurality of website content elements, and storing a respective weighting for each variant of the plurality of variants of the first website content element;
   causing display, within a web page, of (a) a particular variant of the plurality of variants of the first website content element and (b) a second website content element;
   determining a number of times that the particular variant was displayed based at least in part on said display of the first variant within the web page;
   receiving a first user-initiated action directed to the particular variant;
   determining an action count corresponding to a number of user-initiated actions directed to the particular variant based at least in part on the first user-initiated action;
   determining a ratio of (a) the action count corresponding to the number of user-initiated actions directed to the particular variant to (b) the number of times that the particular variant was displayed;
   adjusting the respective stored weighting of the particular variant based on the ratio of (a) the number of user-initiated actions directed to the particular variant to (b) the number of times that the particular variant was displayed;
   selecting the particular variant from among the plurality of variants for displaying the first website content element based on the adjusted respective stored weighting of the particular variant; and
   presenting the particular variant for displaying the first website content element.

16. The media of claim 1, wherein the instructions further cause selecting, based on the respective weighting, the particular variant of the first website content element for displaying the first website content element.

17. The media of claim 1, wherein the instructions further cause refraining from selecting, based on the respective weighting, the particular variant of the first website content element for displaying the first website content element.

18. The media of claim 1, wherein the instructions further cause (a) generating and storing a variant of the first website content element, and (b) receiving user-initiated actions in relation to a particular variant.

19. The media of claim 18, wherein the instructions further cause selecting a particular variant based on the user-initiated actions received.

20. The method of claim 14, further comprising refraining from selecting, based on the respective weighting, the particular variant for displaying the first website content element.

21. The media of claim 1, wherein the instructions further cause:
   receiving user-initiated website content actions in relation to variants of the second website content element;
   storing a record of the user-initiated website content actions in relation to the a second particular variant of the second website content element;
   determining (a) a frequency of website content actions in relation to the second particular variant of the second website content element in comparison to (b) a frequency with which the second particular variant of the second website content element was displayed;
   adjusting the respective stored weighting of the second particular variant of the second website content element based on the frequency of website content actions in relation to the second particular variant of the second website content element in comparison to the frequency with which the second particular variant of the second website content element was displayed;
   determining, based on the adjusted respective stored weighting of the second particular variant, that the second website content element is not to be displayed according to the second particular variant of the second website content element; and
   refraining from presenting the second website content element according to the second particular variant.

* * * * *